United States Patent [19]
Park

[11] Patent Number: 6,058,375
[45] Date of Patent: May 2, 2000

[54] ACCOUNTING PROCESSOR AND METHOD FOR AUTOMATED MANAGEMENT CONTROL SYSTEM

[75] Inventor: Jong-han Park, Seoul, Rep. of Korea

[73] Assignee: Samsung Electronics Co., Ltd., Kyungki-do, Rep. of Korea

[21] Appl. No.: 08/954,584

[22] Filed: Oct. 20, 1997

[30] Foreign Application Priority Data

Oct. 21, 1996 [KR] Rep. of Korea ...................... 96-47316
Jul. 3, 1997 [KR] Rep. of Korea ...................... 97-30825

[51] Int. Cl.⁷ .................................................. G06F 17/60
[52] U.S. Cl. .......................................................... 705/30
[58] Field of Search ................................. 705/16, 24, 28, 705/30, 35, 39

[56] References Cited

U.S. PATENT DOCUMENTS

| | | | |
|---|---|---|---|
| 4,059,748 | 11/1977 | Violino | 714/16 |
| 4,642,767 | 2/1987 | Lerner | 705/30 |
| 4,989,141 | 1/1991 | Lyons et al. | 705/36 |
| 5,093,787 | 3/1992 | Simmons | 705/33 |
| 5,120,944 | 6/1992 | Kern et al. | 235/379 |
| 5,189,608 | 2/1993 | Lyons et al. | 705/30 |
| 5,317,504 | 5/1994 | Nakayama | 705/30 |
| 5,337,263 | 8/1994 | Patermaster | 708/106 |
| 5,371,680 | 12/1994 | Anno et al. | 705/30 |
| 5,390,113 | 2/1995 | Sampson | 705/30 |
| 5,623,405 | 4/1997 | Isono | 705/30 |
| 5,638,519 | 6/1997 | Haluska | 705/28 |
| 5,875,435 | 2/1999 | Brown | 705/30 |

Primary Examiner—James P. Trammell
Assistant Examiner—Nicholas David Rosen
Attorney, Agent, or Firm—Lowe Hauptman Gopstein Gilman & Berner

[57] ABSTRACT

An automatic accounting processor and method far automatically performing an accounting procedure for transaction data on a real time basis through menu selection and input or a data communication network on a computer system, by standardizing, formulating and compounding a management control business of an enterprise. The automatic accounting processor includes a transmitter/receiver, a display/input unit, a storage unit, a processing unit, and an output unit. The automatic accounting processor and method allows an automatic accounting procedure without an accounting knowledge. Also, an accounting procedure and a balancing operation procedure are performed on a real time basis, by automatically controlling errors generated during the accounting procedure, thereby realizing an effective management control.

38 Claims, 10 Drawing Sheets

ACCOUNTING PROCESSOR AND METHOD FOR AUTOMATED MANAGEMENT CONTROL SYSTEM

BACKGROUND OF THE INVENTION

The present invention relates to an accounting processor and method for an automated management control system, and more particularly, to an accounting processor and method for an automated management control system which can perform an accounting operation on a real-time basis by simply inputting transaction data without specific accounting knowledge, by systematically standardizing, formulating and compounding the transaction data.

An automated accounting processing system collects, adjusts, sums and accounts for financial data by systemizing transaction items n an enterprise using a computer to supply financial information useful for an executive's or a user's decision making. In other words, the automated accounting processing system automatically performs a real-time execution of transactions which bring about a change in the financial state, such as production, purchasing, sales, distribution and financial activities.

An accounting process for supplying various decision makers with financial information of the enterprise occurs through a series of procedures from transaction creation to closing. FIG. 1 shows a typical transaction flow and a computerized accounting procedure flow according to computerized business activities of a manufacturer.

For the sake of explanation, sequential numerals are given to arrows representing transaction data and flow in the respective steps of a transaction flow shown in FIG. 1, and the transaction flow and computerized accounting procedure will be briefly explained in the order of the numbers. Here, numeral 1 represents a production order, numeral 2 represents a raw and auxiliary material supply request, numeral 3 represents a raw and auxiliary material purchase order sheet, numeral 4 represents raw and auxiliary material supply from a supplier, numeral 5 represents raw and auxiliary material supply from a purchasing department to a production department, numeral 6 represents merchandise distribution to a distribution department, numeral 7 represents a merchandise production report, numeral 8 represents a payment request sheet, numeral 9 represents a payment approval notice, numeral 10 represents a payment to supplier, numeral 11 represents a purchase request sheet, numeral 12 represents a delivery order, numeral 13 represents an order confirmation notice, numeral 14 represents ordered merchandise delivery, numeral 15 represents a delivery confirmation document (receipt), numeral 16 represents a buyer's payment, and numeral 17 represents a sales money receipt notice, respectively. A series of Business activities by a manufacturer take place in various forms and ways according to the department. In this example, the explanation will be made concerned wit the work float between a production department and a purchasing department, its accounting procedure, initiated by creation of transaction with suppliers of raw and auxiliary materials, creation of transactions between a sales department and a buyer (or customer), and its accounting procedure.

Nowadays, most manufacturers enjoying the advantages of well-developed computer technology have a data network among various departments or divisions so that a considerable portion of businesses related with managerial activities are processed using a computer system. For example, in all businesses with regular customers, transaction data including product sales, supply requests of raw and auxiliary materials or payment approval, are transmitted and received by using a computer network. In a business with a customer not linked to a computer system, the transaction data are exchanged by other communications means such as a facsimile machine or telephone, or by mail.

In a production activity which is the primary activity of an enterprise for pursuing profits, a distribution department (or a distribution management system 150) sends a Production order 1 to a production department (or a production management system 100) for maintaining the optimal inventory of commodities to be sold by a sales department "or a sales management system 135). Based on the production order 1, the production department (production management system 100) checks the inventory of raw and auxiliary materials through a purchasing department (purchase management system 110) before production of requested merchandise. Then, if there is no inventory of the raw and auxiliary materials, a raw and auxiliary material supply request 2 is sent to the purchasing department (purchasing management system 110) for merchandise production.

The purchasing department (purchasing management system 110) sends a raw and auxiliary material purchase order sheet 3 to a raw and auxiliary material supplier 115 (or a supplier's computer system) for supplementing the shortage, based on the raw and auxiliary supply request 2 sent from the production department.

The supplier 115 supplies raw and auxiliary materials to the purchasing department (purchasing management system 110) of the manufacturer, based on the raw and auxiliary material purchase order sheet 3 sent from the purchasing department (purchasing management system 110). The received raw and auxiliary materials are inspected and approved by the purchasing department (purchasing management system 110) and then are supplied to a production line of the production department (production management system 100) to complete production. Then, the produced commodities are inspected and then supplied to the distribution department (distribution management system 150). Also, the production department 100 sends a merchandise production report 7 to the accounting department 160. Then, the accounting department 160 performs an accounting process using the merchandise production report 7, based on accounting principles, inputs and stores the account-processed data.

The supplier 115 sends a payment request sheet 8 for requesting payment for the supplied commodities to the purchasing department 110 of the enterprise. Then, the purchasing department 110 sends a payment approval notice 9 to the supplier 115 and the accounting department 160, respectively, to execute payment to the supplier 115.

The accounting department 160 executes an accounting process on the purchase money of the raw and auxiliary materials, to be paid to the supplier 115 under payment terms prescribed with the supplier 115, according to accounting principles, based on the payment approval notice 9 sent from the purchasing department 110, inputs and stores the accounting-operated data.

Also, the accounting department (accounting management system 160) remits the money to the bank account of the supplier 115 or pays the money to the supplier 115 in the form of checks or notes under payment terms prescribed with the supplier 115. The main activities of the sales department (sales management system 135) are to sell commodities to a customer, i.e., a buyer, 140. To buy required commodities, the customer sends a purchase request sheet 11 to the sales department (sales management system 135). At the customer's request, the sales department (sales management system 135) checks the inventory of the requested merchandise in the distribution department (distribution management system 105) using a computer system and then inputs the inventory results to the sales management system 135.

A delivery order 12 for the ordered merchandise from the customer 140, prepared by the sales department (sales management system 135), is sent to the distribution department (distribution management system 150). The sales department (sales management system 135) sends an order confirmation notice 13 indicating that the customer's order has been confirmed to the distribution department (distribution management system 150). Then, the distribution department (distribution management system 150) delivers the ordered merchandise to the customer 140, receives a delivery confirmation document (receipt) 15 from the customer 140, and inputs the data into the distribution management system 150, by which it is notified or certified that the order of the customer has been accepted and the delivery has been completed.

The distribution department (distribution management system 150) sends the delivery confirmation notice (or receipt 15) received from the customer 140 to the sales department (sales management system 135) and the accounting department (accounting management system 160), respectively. The sales department inputs the delivery confirmation data to the sales management system 135. The accounting department executes accounting process on the sales money and delivered merchandise and inputs the accounting data to the sales management system 135 to then be stored. The customer 140 transfers the money for the commodities to the bank account of the enterprise (manufacturer) or pays the money in the form of checks or notes, according to the terms of the trade prescribed mutually.

The data corresponding to the sales money received from the customer 140 is input to the sales management system 135 of the sales department to deduct the corresponding amount from the receivables of the customer 140. Then, a sales money receipt notice 17 is sent to the accounting department for an accounting process and input to the accounting management system 160 to then update data. In such a manner, the business activities of the enterprise are undertaken repeatedly through transaction creation, processing, updating and termination. Although not exactly the same, most enterprises have a transaction flow similar to that as described above. Particularly, the accounting process of the transaction created by production, sales, financial activities is a requisite job of an enterprise. An accounting department executes an accounting process on created transaction according to accounting principles, based on evidences and transaction items, and performs a series of jobs up to financial closing.

FIG. 2 shows a series of accounting circulations according to a created transaction.

As shown in FIG. 2, a series of the accounting processes of an enterprise are executed from transaction creation, to transaction data collection, adjustment, summing and accounting process, to data input to a commuter system, to preparation of financial statements and to Financial closing, which will now be described in more detail.

Generally, in terms of an accounting process, transaction brings about change in assets, liabilities and stock holder's equity, income or expense creation. For example, if an enterprise purchases a computer system, this is referred to as transaction creation because there is a change in the assets of the enterprise, for which an accounting process is executed by a conventional manual method, not by a computerized accounting process of today, as follows.

The transaction creation is recorded in an accounting book, which is initiated by a manual entry operation in a journal. To journalize the transaction, it is first confirmed whether the transaction has brought about a change in any item of assets, liabilities and capital of an enterprise, or profits and expenses have occurred. Then, the extent of the change or occurrence must be measured in a monetary unit. For example, if an enterprise (X) sells 500 pieces of a merchandise (A) at a price of ₩11,000 (unit price ₩10,000) on credit, the entry operation is executed as follows:

| (Debit) | (Credit) |
|---|---|
| Trade receivables: 5,500,000 | Sales: 5,500,000 |
| (Enterprise X) | (500 pieces of merchandise A) |
| cost: 5,000,000 | Merchandise A: 5,000,000 |
| (500 pieces of merchandise A) | (500 pieces of merchandise A) |

As demonstrated above, the entry is composed of at least one or more debit items (left hard side of transaction account) and credit items (right hard side of transaction account). Each sum of the debit and credit is always equal according to double entry bookkeeping principles. Transaction data is recorded (entered) in the entry book in the order of dates of transaction created.

If the manual entry operation is completed in such a manner, an entry or recordation for preparation of an accounting report must be made. Before the introduction or computerized accounting systems, most accounting jobs were performed manually. In other words, a series of work jobs were performed by manual entry operations for making a journal, a ledger, a general ledger, trial balance sheets, financial statements. However, according to the rapid development of computer systems, keeping accounts and preparing financial statements and account closing reports can be achieved just by inputting transaction data to a computerized data processing system, instead of manual recordation of accounting data, through a series of procedures including data recordation, assortment, calculation, processing and storage.

The computerized accounting process shown in FIG. 2 will now be described in more detail. If a transaction is created and then transaction evidence documents are prepared, data conversion occurs for inputting the transaction data to a medium recordable by a computer or a memory unit of the computer. As an input medium, a diskette, a magnetic tare or a magnetic disc can be used. Otherwise, data may he directly input to the computer through an on-line terminal.

The input data makes up a transaction file. The transaction file serves as a journal. The accounting process is executed based on the transaction file. The transaction file is mainly used for updating a master file and is sometimes used for searching the contents of the master file.

According to the respective records of the transaction file, records of the master file are added, deleted or modified. The master file serves as a subsidiary ledger and a general ledger as well as a journal. By using the updated master file, necessary information can be viewed, searched or queried. Also, the account closing reports can ne prepared based on the updated master file. The master file is kept as a permanent file.

FIG. 3 shows a general accounting process, i.e., a flow diagram of a journalizing process, which will now be described. First, if a transaction is created (step 300), money is received or paid, accordingly. That is to say, payment is made for purchase and money receipt is made for sales. According to the transaction created, sorting of payment and receipt is performed (step 310). According to the sorted transaction form, accounts to be entered are established (step 320). The establishment of the accounts must be made precisely, based on accounting principles. Then, a determination is made as to which of either debit side or credit side the established accounts is to be entered, according to double entry bookkeeping principles (step 330). If the debit side and the credit side are determined, the amount by account is determined (step 340) and then accounts are divided into the debit side and the credit side to then complete journalization according to the accounting principles (step 350). Then, data for the contents journalized in the accounting processing system are input (step 360), and the input data are processed by a computer system to then prepare various ledgers, financial statements and financial closing reports and to complete the closing (step 370).

A balancing operation is to deal with or terminate transactions leading to a change in created transaction items by respective accounts, i.e., assets, liabilities and capital, which are not processed or terminated by the operation at the past transaction time. The balanced accounts are referred to as the balance by the respective accounts of assets, liabilities and capitals.

FIG. 4 is a flow diagram of a general procedure of the balancing operation in an accounting process, which will now be described in detail.

If a transaction to be balanced in the accounting process (step 400), accounts to be balanced are fixed (step 410), and the transaction to be balanced is journalized by the fixed accounts (step 420). The journalized transaction is sorted by account (step 430). The accounts corresponding to the transaction to be balanced are confirmed by the accounting processing system and input thereto (step 440). Then, the balancing operation is performed (step 450).

As described above, to execute the accounting process for complicated and various transactions, one must be equipped with specific accounting knowledge. In other words, to effect the accounting process according to a change in assets, liabilities or capitals, or creation of a transaction in profits and expenses, the detailed contents of the transaction occurring in variable and complicated manner in enterprise activities should be analyzed and confirmed. Then, the transaction details must be journalized precisely according to accounting principles, and the journalized transaction details should be input to the accounting processing system, which can be handled only by skilled accounting specialists. In other words, the accounting job is too difficult and complicated to be handled by ordinary people having little or no accounting knowledge.

Further, the transaction patterns of an enterprise are variable according to business types and the transaction occurs in various manners, with transaction data unceasingly created and extinguished. If the transaction is created, accounting transaction evidence documents are generated as the transaction evidence. Based on the transaction evidence documents, an accountant of the enterprise must journalize precise accounts summed up and sorted according to accounting principles, which are obtained from the accounting information on the created transaction, and must input the journalized accounts to the accounting processing system. If the accounting process is performed in such a manner as described above through a series of procedures, the generation of several data errors is unavoidable.

Also, the accuracy of the conventional accounting process depends upon the practical knowledge and skills of the accountant, and a skilled supervisor must verify the accounting process. Thus, the accounting process of the conventional accounting process is ineffective and has limits in dealing with a tremendous amount of iterative transaction data promptly and precisely.

Further, much time is required in the balancing operation. First of all, items for the transaction created in the past must be processed accurately.

Many enterprises use various kinds of Management Information Systems (MIS) custom-developed in-house. However, they still have basic problems in performing an automatic accounting process for all their businesses to be linked with the transactions occurring in various departments of the enterprise. Generally, the MIS deals with management control operations including purchase management, production management, sales management, fund management, and customer service management, in a multiple manner.

The management control operations includes purchase management for treating business affairs concerned with goods purchase, production management for handling business affairs concerned with production, sales management for handling business affairs concerned with goods sales, fund management for handling and managing the all transactions occurring during the financial activities, and customer service management for controlling the customers, buyers or suppliers. These various management control operations occurring during management activities are individually performed or inter mingle with one another, as shown in FIG. 1. However, the accounting processes for the respective departments are not coordinately linked with one another. Thus, the accounting closing for numerical notation of management activities is not effectively performed by coordinately linking the transactions for the entire management control operations.

Particularly, as shown in FIG. 1, in performing the accounting process for the various business affairs concerned with the business management activities, if the transaction data created at various departments (production, purchase, sales, distribution, etc.) are not automatically processed by the personnel in charge of the respective business carts using a computerized accounting system, transaction evidence documents for the created transaction data must be transferred to the accounting department using a network or other communication means. Then, the accountant must input data for the transferred vouchers to the accounting processing system according to the accounting principles. By doing so, the accounting process and accounting closing may be delayed. Further, the accounting process, which can be achieved by only inputting transaction data once through a computerized accounting system, must be performed at least twice. That is, the transaction data created in the respective departments is not account-processed at the same time with once-input transaction data, on a real time basis. Thus, it is difficult to achieve effective business management control.

SUMMARY OF THE INVENTION

It is an object of the present invention to provide an accounting processor and method for an automated management control system which can selectively extract accounting data for financial management from an integrated management control database and store the same therein to thus perform an automatic accounting process on a real-time basis according to accounting principles, by systematically standardizing, formulating and compounding the transaction data to process a series of business activities including production, sales, purchasing and financial activities through the integrated management control database, and then by simply inputting transaction data without having specific accounting knowledge.

It is another object of the present invention to provide an accounting processor and method for an automated management control system, which can perform a real-time accounting process automatically by transmitting and receiving transaction data created between at least two business partners through a networking method using data communication.

It is still another object of the present invention to provide an accounting processor and method for an automated management control system, which can perform a real-time accounting process automatically by using both the networking method and the simple inputting method depending upon the enterprise circumstances.

To accomplish the first object of the present invention, there is provided an apparatus for executing an accounting process on transaction data including transaction information, transaction terms information and standard management information comprised of predetermined management items, comprising: a display/input unit, a storage unit and a processing unit, wherein the display/input unit displays an input screen of predetermined transaction data and a balance details screen for the balance operation, selects a predetermined menu supplied from the screen or inputs the transaction data, wherein the storage device comprises: a transaction data storage portion for storing the transaction data selected and input from the display/input unit; an accounting ledger storage portion for storing account information account-processed for Financial management, debit/credit information and Predetermined standard management information comprised of at least a transaction amount; and a balance-by-account storage portion for storing accounts corresponding to results of the balancing operation and predetermined standard information comprised of at least transaction amount, and wherein the processing unit comprises: a first processing portion for displaying a transaction data input screen on the display/input unit, checking whether the input transaction data is to be balance-deducted and storing the input transaction data into the transaction data storage portion; a transaction classifying portion for generating corresponding account information and debit/credit position information from the transaction information, transaction terms information and the standard management information related thereto, stored in the transaction data storage portion; a journal processing portion for classifying and summing the account information, the debit/credit position information and the predetermined standard management information comprised of the transaction amount into a debit side and a credit side, storing the same in the accounting ledger storage portion, and determining whether the transaction data is to be balancing-operated; and a balancing operation processing portion for displaying balance details of the relevant customer for the accounts corresponding to the transaction data if the transaction data is determined to be balance-deducted in the First processing portion, classifying the data to be balancing-operated into data to be balance-summed and data to be balance-deducted, summing the data to be balance-summed to the balance details of the relevant customer for the corresponding account, deducting the data to be balance-deducted from the balance details, and storing the result in the balance-by-account storage portion.

Also, when the transaction data includes transaction form information, transaction form information, and standard management information corresponding to the transaction form, transaction pattern and transaction terms and comprised of predetermined management items for detailed management, and the transaction data corresponds to a predetermined data format, the storage device further comprises: a first classification temporary storage portion for temporarily storing account information, debit/credit information and predetermined standard management information comprised of at least the transaction amount; and a second classification temporary storage portion for extracting data be balancing-operated among the transaction data and temporarily storing the same, the processing unit comprises: a first processing portion for displaying a transaction data input screen on the display/input unit, checking whether the transaction data is to be balance-deducted, if the transaction data is selected and input through the display/input unit; a storage processing portion for storing the transaction data in the transaction data storage portion; a transaction classifying portion for reading a transaction form, a transaction pattern, transaction terms and standard management information concerned with the transaction form, transaction pattern and transact-on terms, generating the corresponding account and debit/credit position information from the read data, and storing the generated accounts, debit/credit information and predetermined standard management information comprised of the transaction amount in the first classification temporary storage portion; a journal processing portion for classifying and summing the account information, debit/credit position information and the predetermined standard management information comprised of the transaction amount into a debit side and a credit side, storing the same in the accounting ledger storage portion, determining whether the data is to be balancing-operated, and storing the corresponding account information, debit/credit information and the predetermined standard management information comprised of the transaction amount in the second classification temporary storage portion; and a balancing operation processing portion for reading balance details of the relevant customer for the accounts corresponding to the transaction data selected and input from the balance-by-account storage portion if the transaction data is determined to be balance-deducted in the first processing portion, displaying the same on the display/input unit, classifying the data to be balancing-operated into data to be balance-summed and data to be balance-deducted to then sum or deduct the balance-summed/deducted data to/from the balance details of the relevant customer for the corresponding account, and storing the result in the balance-by-account storage portion.

The accounting processor further comprises an output unit connected to the processing unit for outputting financial information including financial statements having a predetermined format, wherein the processing unit further comprises: an output processing portion or reading the data stored in the accounting ledger storage portion and the balance-by-account storage portion by a user's request, outputting the read data to the output unit to be suitable for a predetermined format, and displaying the same on the display/input unit.

In the accounting processor, when data for management control is standardized, formulated and compounded into a predetermined data format, and the transaction data corresponds to the standardized, formulated and compounded data format, the display/input unit receives the transaction data according to the data format, the transaction data storage portion of the storage device comprises: an integrated management control database for storing the transaction data selected and input through the display/input unit and having databases by management control departments divided according to predetermined management control items; ana an integrated accounting database for storing data necessary for accounting process for financial control, among the data stored in the integrated management control database, the storage processing portion comprises: a second processing portion for classifying the transaction data selected and input through the display/input unit to be stored in the databases for the respective departments of the integrated management control database and storing the classified data for the respective departments in the corresponding databases; and a third processing portion for selectively extracting the transaction data to be account-processed for financial control from he databases for the respective departments or the integrated management control database and storing the extracted data in the integrated accounting database, and the transaction classifying portion reads data from the integrated accounting database.

The first processing portion comprises: a transaction form display portion for displaying payment and receipt items corresponding to the transaction form on a menu screen of the display/input unit; a transaction pattern display portion for displaying purchasing, warehousing, fund expenditure, financial transfer payment items corresponding to transaction patterns on the display/input unit, if the payment item is selected from the transaction form display portion as the transaction form, and displaying sales, delivery, fund revenue, financial transfer receipt items corresponding to transaction patterns on the display/input unit, if the receipt item is selected by the transaction form display portion as the transaction form; a detailed pattern display portion for displaying a predetermined detailed item corresponding to the selected transaction pattern and decided according to accounting principles on the display/input unit, if the transaction pattern is selected by the transaction pattern display portion; a first standard management information display portion for displaying at least one or more standard management items corresponding to the detailed item on the display/input unit to then be selected and input, if the detailed item concerned with the transaction pattern is selected by the detailed pattern display portion; a balancing target data determining portion for determining whether the transaction to be balancing-operated is to be balance-deducted, according to the transaction form, transaction pattern, detailed pattern and standard management information, respectively selected and input from the transaction form display portion, transaction pattern display portion, the detailed pattern display portion and the first standard management information display portion; a transaction terms display portion for selecting transaction terms corresponding to cash, a bank deposit, a note, a credit and an adjustment and displaying a transaction terms menu screen for inputting the transaction amount corresponding to the selected transaction terms item on the display/input units if the transaction to be balancing-operated is determined by the balancing operation target determining portion to not be balance-deducted, and if the to-be-balancing-operated transaction is determined to be balance-deducted, notifying that the target data is to be balancing-operated, reading the balance details of the relevant customer for the corresponding account from the balance-by-account storage portion to then be displayed in the display/input unit, and displaying the transaction terms menu screen on the display/input unit; and a second standard management information display portion for displaying at least one or more standard management items corresponding to the transaction terms if the transaction terms item is selected and input from the transact on terms display portion.

The journal processing portion comprises: a classifying and summing portion for classifying predetermined standard management information, comprised of the accounts information, debit/credit position information and transaction amount stored in the first classification temporary storage portion, into a debit side and a credit side and summing the classified transaction data for each of the debit/credit side; a normal processing portion for displaying the journalizing result of the classifying and summing portion on the display/input unit if the sum of the debit/credit side transaction amount agrees with balancing principles, storing the transaction data in the accounting ledger storage portion, determining transaction data to be balancing-operated, and storing the determined data in the second classification temporary storage portion; and an error processing portion for displaying an error message on the display/input unit if the sum of the debit/credit side transaction amount does not agree with balancing principles, and deleting the corresponding error data input from the display/input unit or correcting the corresponding error item.

The balancing operation processing portion further comprises: a balance input controller for processing as an error the transaction data for the transaction amount if the transaction amount is larger than the corresponding balance amount of the relevant customer for the corresponding account displayed on the display/input unit by the balancing operation processing portion.

According to another aspect of the present invention, there is provided a balancing operation processing apparatus for balancing-operating transaction data created between customers and account-processing the same, comprising: a display/input unit, a storage unit and a processing unit, wherein the display/input unit displays an input screen for processing transaction data, and selects at least one or more menus supplied from the input screen and inputting the transaction data, wherein the storage device being comprised of: a balance-by-account storage portion for storing predetermined standard information comprised of accounts corresponding to results of the balancing operation and transaction amount, and wherein the processing unit being comprised of: a balancing operation target data determining portion for determining whether the transaction data selected and input by the display/input unit is to be balance-summed or balance-deducted; a balance details searching portion for reading the balance details of the relevant customer for the account corresponding to the predetermined standard management information comprised of the transaction form, transaction pattern and transaction amount selected and input from the balance-by-account storage portion if the transaction data is determined to be balance-deducted in the balancing operation target data determining portion, and displaying the read balance details on the display/input unit; a transaction terms display portion for displaying the standard management information comprised of transaction terms if the balance details is displayed on the display/input unit, and inputting the transaction terms and the related standard management information; a balancing process classifying portion for classifying the transaction data into data to be balance-summed and data to be balance-deducted if the transaction terms and the related standard management information are input; and a balance adjustment processing portion for reading the corresponding account of the balance-by-account storage portion and the balance details of the relevant customer and deducting the transaction amount from the balance if the transaction data is determined to be balance-deducted, and for reading the corresponding account of the balance-by-account storage portion and the balance details of the relevant customer and summing the transaction amount to the balance if the transaction data is determined to be balance-summed.

The balancing operation processing apparatus further comprises: a balance input controller for processing as an error the transaction data for the transaction amount if the transaction amount is larger than the corresponding balance amount of the relevant customer for the corresponding account displayed on the display/input unit by the balancing operation processing portion.

Also, to accomplish another object of the present invention, there is provided an accounting processing method using an accounting processing apparatus comprising: a display/input unit for displaying an input screen of predetermined transaction data and inputting the transaction data; a transaction data storage portion for storing the input transaction data; an accounting ledger storage portion for storing account information, debit/credit information and predetermined standard management information comprised of a transaction amount; and a balance-by-account storage portion for storing balancing-operated accounts and predetermined standard management information comprised of at least the transaction amount, when the transaction data includes transaction information, transaction terms information and predetermined standard management information comprised of predetermined management items, the method comprising the steps of: displaying the transaction data input screen on the display/input unit; determining whether transaction data is to be balance-deducted if the transaction data is input, and displaying the balance details of the relevant customer for the account stored in the balance-by-account storage portion if the input transaction data is determined to be balance-deducted; inputting the relevant standard management information comprised of the transaction terms and the transaction amount if the balance details are displayed, normally processing the transaction amount if the input transaction amount is less than or equal to the balance amount of the corresponding balance details, and error-processing the same if the input transaction amount is larger than the balance amount of the corresponding balance details; storing the input transaction data in the transaction data storage portion; classifying the transaction by generating account information corresponding to the transaction information, transaction terms information and the related standard management information, and debit/credit position information; journalizing by classifying the predetermined standard management information including the generated account information, debit/credit position information and transaction amount into a debit side and a credit side, summing the same, displaying the result on the display/input unit, storing the same in the accounting ledger storage portion if there is no error, and checking whether the transaction data is to be balancing-operated; determining whether the transaction data is to be balance-summed or balance-deducted if the transaction data is determined to be balancing-operated; and summing the transaction data to be summed to the corresponding balance details of the customer for the account stored in the balance-by-account storage portion if the transaction data is determined to be balance-summed, and deducting the transaction data to be deducted from the corresponding balance details of the customer for the account stored in the balance-by-account storage portion if the transaction data is determined to be balance-deducted, and storing the result in the balance-by-account storage portion.

When the transaction data includes transaction form information comprised of items representing receipt and payment, transaction pattern information comprised of at least an item representing a purchase, detailed transaction pattern information comprised of at least an item representing purchase of the merchandise, transaction terms information comprised of at least predetermined transaction terms representing cash, and standard management information comprised of a predetermined management item for detailed management, corresponding to the transaction form, transaction pattern and transaction terms, the transact on classifying step comprises the steps or reading the transaction form, the transaction pattern, the transaction terms and the standard management information concerned with the transaction form, transaction pattern, and transaction terms, from the transaction data storage portion, generating an account information corresponding to the read data and debit/credit position information, and temporarily storing the generated accounts information, debit/credit information and predetermined standard management information including the transaction amount, the journalizing step comprises the steps of classifying the predetermined standard management information including the stored account information, debit/credit position information and transaction amount into a debit side and a credit side, to sum the same, displaying the result on the display/input unit, to store the same in the accounting ledger storage portion if there is no error, and temporarily storing the transaction data to be balancing-operated, and the determining step comprises the steps of reading the standard management information comprised of the temporarily stored account information, debit/credit position information and transaction amount, and determining whether the transaction data is to be balance-summed or balance-deducted.

The accounting processing method further comprises the step of: reading the data stored in the account ledger storage portion and the balance-by-account storage portion by user's request, outputting the read data to be suitable to a predetermined format to the output unit, and displaying the same on the display/input unit.

In the accounting processing method, when the display/input unit standardizes, formulates and compounds the transaction data for management control into a predetermined data format, displays a predetermined input screen for inputting the transaction data, selects a menu item supplied from the input screen or inputting the transaction data, the transaction data storage portion comprises an integrated management control database for storing the transaction data selected and input through the display/input unit and having databases by management control departments divided according to predetermined management control items, and an integrated accounting database for storing data necessary for an accounting process for financial control, among the data stored in the integrated management control database, the storing step of the transaction data storage processing portion comprises the steps of: classifying the transaction data selected and input through the display/input unit to be stored in the databases for the respective departments of the integrated management control database and storing the classified data for the respective departments in the corresponding databases; selectively extracting the transaction data to be account-processed for financial control from the databases for the respective departments of the integrated management control database and storing the extracted data in the integrated accounting database; and reading a transaction form, a transaction pattern, transaction terms and standard management information concerned with the transaction form, transaction pattern and transaction terms, generating corresponding accounts and debit/credit position information from the read data, and storing predetermined standard management information comprised of the generated accounts, debit/credit information and transaction amount.

The journalizing step comprises the steps of: classifying the generated predetermined standard management information comprised of the accounts information, debit/credit position information and transaction amount into a debit side and a credit side and summing the classified transaction data; normally processing the transaction data by displaying the journalizing result on the display/input unit if the sum of the debit/credit side transaction amount does not agree with balancing principles, storing the transaction data in the accounting ledger storage portion, and temporarily storing the to-be-balancing-operated transaction data; and error-processing the transaction data by displaying an error message on the display/input unit if the sum of the debit/credit side transaction amount is not accordant to balancing principles, and deleting the corresponding error data input from the display/input unit or correcting the corresponding error item.

Alternatively, there is provided a balancing operation processing method using a balancing operation processing apparatus having a display/input unit for displaying an input screen for processing transaction data, and selecting at least one or more menus supplied from the input screen and inputting the transaction data, and a balance-by-account storage portion for storing predetermined standard information comprised of the balancing-operated accounts and transaction amount, the method comprising the steps of: determining whether the transaction data selected and input by the display/input unit is to be balance-summed or balance-deducted; reading the balance details of the relevant customer for the account from the balance-by-account storage portion if the transaction data is determined to be balance-deducted, and displaying the read balance details on the display/input unit; inputting the transaction terms and the related standard management information if the balance details is displayed on the display/input unit; normal-processing the balance details if the displayed balance amount is less then or equal to the transaction amount of the transaction data input through the display/input unit, and processing the balance details as an error if the input transaction amount is greater than the displayed balance amount; determining whether the normally processed transaction data is to be balance-summed or balance-deducted; and account-processing the transaction data to be balance-summed, summing the predetermined management information comprised of accounts and the transaction amount to the balance amount of the relevant customer for the corresponding account stored in the balance-by-account storage portion, and storing the result in the balance-by-account storage portion if the transaction data is determined to be balance-summed, and account-processing the transaction data to be balance-deducted, deducting the predetermined management information comprised of accounts and the transaction amount from the balance amount of the relevant customer for the corresponding account stored in the balance-by-account storage portion, and storing the result in the balance-by-account storage portion if the transaction data is determined to be balance-deducted.

According to still another aspect of the present invention, there is provided an apparatus for executing an accounting process by receiving transaction data through a data communication network, comprising: a transaction data transmitting unit for transmitting created transaction data; a transaction data receiving unit for receiving the transmitted transaction data; and a network for connecting the transaction data receiving unit to at least one or more transaction data transmitting units, wherein a the transaction d ata receiving unit includes a data receipt display/input unit, a storage unit, a processing unit and an output unit, wherein, when the transaction data includes transaction form information comprised of items representing receipt and payment, transaction pattern information comprised of items representing purchase and sales, transaction terms information comprised of predetermined transactions terms having at least cash, and standard management information comprised of predetermined management items for detailed management, corresponding to the transact-ion form, transaction pattern and transaction terms, and corresponds to a predetermined data format, the data receipt display/input unit displays the received transaction data by the command of the processing unit, and the storage unit comprises: a transaction data storage portion for storing the transaction data; a first classification temporary storage portion for temporarily storing account information, debit/credit position information and predetermined standard management information comprised of at least the transaction amount; an accounting ledger storage portion for storing the account information, debit/credit information and predetermined standard management information comprised of at least the transaction amount, account-processed for financial management; a second classification temporary storage portion for extracting the data to be balancing-operated among the transaction data and temporarily storing the same; and a balance-by-account storage portion for storing the accounts corresponding to results of the balancing operation and predetermined standard information comprised of at least the transaction amount, the processing unit comprises: a receipt determining processing portion for determining whether the data transmitted from the transaction data transmitting unit through the network is capable of being received, and determining whether the data is converted into a code which can be interpreted and processed if the data is capable of being received; a received data display processing portion for receipt-processing the received transaction data if the data is determined to be capable of being received, and generating a command to display the data through the data receipt display/input unit; a first processing portion for sequentially processing the received transaction data according to processing conditions of the corresponding items of a transaction form, a transaction pattern, transaction terms and standard management information concerned with the transaction form, transaction pattern ana transaction terms, determining whether the processed transaction data is to be balancing-operated, and displaying normally processed transaction data on the data receipt display/input unit if the transaction data to be balancing-operated is determined to be balance-deducted and then normally processed; a receipt error processing portion for deleting the received and receipt-processed transaction data if the transaction data is determined to be in capable of being received and being receipt-processed, the transaction data displayed on the data receipt display/input unit is determined to be different from the actual transaction data by the user's verification, or the receipt-processed transaction data which is to be balancing-operated is compared with the corresponding balance details to be processed as an error, and notifying the deletion to the transaction data transmitting unit; a data storage processing portion for storing the transaction data comprised of the transaction form, transaction pattern, transaction terms and standard management information concerned with the transaction form, transaction pattern and transaction terms in the transaction data storage portion, if the transaction data is normally processed; a transaction classifying portion for reading the transaction data from the transaction data storage processing portion, generating account information and debit/credit position information corresponding to the read transaction data, and storing the generated account information, debit/credit position information and predetermined standard management information having at least the transaction amount in the first classification temporary storage portion; a journal processing portion for classifying the account information, debit/credit position information and the predetermined standard management information having at least the transaction amount into a debit side and a credit side, and summing the same, normally processing the same if the sum of the debit/credit side transaction amount agrees with balancing principles, displaying the journalizing result on the data receipt display/input unit, storing the transaction data in the accounting ledger storage portion, displaying an error message on the data receipt display/input unit if the sum of the transaction amount does not agree with the balancing principles, determining transaction data to be balancing-operated among the normally processed transaction data and storing the corresponding account information, debit/credit position information and predetermined standard management information having the transaction amount; a balancing operation processing portion for searching balance details of the relevant customer for the accounts corresponding to the transaction data if the transaction data is determined to be balance-deducted in the first processing portion, comparing the balance details with the data to be balance-deducted, error-processing and notifying the receipt error processing portion if the transaction amount of the transaction data to be balance-deducted is greater than that of the searched balance details, normally processing of the transaction amount of the transaction data to be balance-deducted is less than or equal to that of the searched balance details, classifying the transaction data into data to be balance-summed and data to be balance-deducted, searching the balance details of the relevant customer for the corresponding account from the balance-by-account storage portion, adding transaction data the to be balance-summed to the searched balance details, deducting the to be balance-deducted transaction data from the searched balance details if the data is classified into the data to be balance-deducted, and storing the result in the balance-by-account storage portion; and an output processing portion for reading the data stored in the accounting ledger storage portion and the balance-by-account storage portion by the user's request, outputting the read data according to a predetermined format to the output unit, and displaying the same on the data receipt display/input unit.

When the transaction data for management control is standardized, formulated and compounded into a predetermined data format to be commonly used throughout all departments of an enterprise for business activities, and the transaction data includes transaction form information comprised of items representing receipt and payment, transaction pattern information comprised of items representing purchase and sales, transaction terms information comprised of predetermined transactions terms having at least cash, and standard management information comprised of predetermined management items for detailed management, corresponding to the transaction form, transaction pattern and transaction terms, and corresponds to a predetermined data format, the transaction data storage portion of the data storage unit comprises an integrated management control database for storing the transaction data displayed on the data receipt display/input unit by the received data display processing portion and normally processed, and having databases by management control departments divided according to predetermined management control items, and an integrated accounting database for storing data necessary for an accounting process for financial control, among the data stored in the integrated management control database, the storage processing portion comprises second processing portion for classifying the transaction data to be stored in the databases for the respective departments of the integrated management control database for integrated control of the transaction data if the management control data is normally processed, and storing the classified data for the respective departments in the corresponding databases, and a third processing portion for selectively extracting the transaction data to be account-processed for financial control from the databases for the respective departments of the integrated management control database and storing the same in the integrated accounting database, and the transaction classifying portion reads data from the integrated accounting database.

The receipt determining processing portion comprises: a data receiver for determining whether the data transmitted from the transaction data transmitting unit includes a compulsory receipt item, notifying the determination result to the error processing portion if the data is determined to be in capable of being received, and receiving the transmitted data if the data is determined to be capable of being received; a format converter for sequentially converting the data received from the data receiver to be suitable for a predetermined format; and a code conversion processor for code-conversion-processing the converted data to correspond to the account-processible transaction form, transaction pattern, transaction terms and standard management information concerned with the transaction form, transaction pattern, transaction terms, and notifying the error processing portion that the data does not agree with the code conversion processing condition if the data does not agree with the code conversion processing condition.

The data receipt display/input unit of the transaction data receiving unit additionally displays a predetermined input menu screen for inputting data further necessary concerned with the received transaction data, Here, the processing unit of the transaction data receiving unit further comprises a received data display processor for commanding the first processing portion to receipt-process the received transaction data if the data is determined to be capable of being received in the receipt determining processing portion, sequentially processing the transaction data receipt-processed by the first processing portion according to the processing conditions of the corresponding items of the transaction form, transaction pattern, transaction terms and standard management information related to the transaction form, transaction pattern and transaction terms, output items to be additionally input if the processed transaction data is suitable to the processing conditions and it is determined that there are items to be further processed, display the processed transaction data on the data receipt display/input unit, and an additional input display processing portion for sequentially displaying items to be additionally input to the data receipt display/input unit so that a predetermined menu screen for additionally inputting the corresponding item of the data deleted by the user's verification for not being the compulsory receipt item, the corresponding item of the data deleted by the user for the reason of being error-processed by the journalizing portion, and items to be additionally input, is suitable to the processing conditions of the first processing portion, and the data storage processing portion of the processing unit stores the transaction data comprised of the transaction form, the transaction pattern, the transaction terms and the standard management information concerned with the transaction form, transaction pattern and transaction terms in the transaction data storage portion or the integrated management control database and the integrated accounting database if the transaction data is normally processed by the data receipt display/input unit.

For the purpose of receiving the transaction data directly from a user, not from the network, the transaction data receiving unit comprises a transaction form display portion for displaying payment and receipt items corresponding to the transaction form on a menu screen of the display/input unit; a transaction pattern display portion for displaying purchasing, warehousing, fund expenditure, financial transfer payment items corresponding to transaction patterns on the display/input unit if the payment item is selected from the transaction form display portion as the transaction form, and displaying sales, delivery, fund revenue, financial transfer receipt items corresponding to transaction patterns on the display/input unit if the receipt item is selected by the transaction form display portion as the transaction form; a detailed pattern display portion for displaying a predetermined detailed item corresponding to the selected transaction pattern and decided according to accounting principles on the display/input unit, if the transaction pattern is selected by the transaction pattern display portion; a first standard management information display portion for displaying at least one or more standard management items corresponding to the detailed item on the display/input unit to then be selected and input, if the detailed item concerned with the transaction pattern is selected by the detailed pattern display portion; a balancing operation target data determining portion for determining whether transaction the to be balancing-operated is to be balance-deducted, according to the transaction form, transaction pattern, detailed pattern and standard management information, respectively selected and input from the transaction form display portion, transaction pattern display portion, detailed pattern display portion and first standard management information display portion; a transaction terms display portion for selecting transaction terms corresponding to cash, bank deposits, notes, credit and adjustments and displaying a transaction terms menu screen for inputting the transaction amount corresponding to the selected transaction terms item on the display/input unit if the transaction to be balancing-operated is determined by the balancing operation target determining portion to not be balance-deducted, and if the transaction to be balancing-operated is determined to be balance-deducted, notifying that the target data is to be balancing-operated, reading the balance details of the relevant customer for the corresponding account from the balance-by-account storage portion to then be displayed in the display/input unit, and displaying the transaction terms menu screen on the display/input unit; and a second standard management information display portion for displaying at least one or more standard management items corresponding to the transaction terms if the transaction terms item is selected and input from the transaction terms display portion.

The balancing operation processing portion further comprises: a balance input controller for reading the balance details of the relevant customer for the account corresponding to the transaction data selected and input from the balance-by-account storage portion by means of the balancing operation processing portion and displaying the read data on the data receipt display/input unit if the transaction data selected and input from the data receipt display/input unit is determined to be balance-deducted by the balancing operation target data determining portion, normally processing the balance details if the input transaction amount is less than or equal to the displayed balance details, and processing the balance details as an error if the input transaction amount is greater than the displayed balance details.

According to still another aspect of the present invention, there is provided an accounting processing method using an accounting processing apparatus comprising: one or more transaction data transmitting units for transmitting created transaction data; a transaction data receiving unit having a receipt display/input portion for verifying the transaction data received from the transaction data transmitting unit and displaying balance details for balancing operation processing, a transaction data storage portion for storing the data verified by the data receipt display/input unit, an accounting ledger storage portion for storing accounts information, debit/credit information and predetermined standard management information comprised of at least transaction amount, and a balance-by-account storage portion for storing accounts to be balancing-operated and predetermined standard management information comprised of at least the transaction amount; and a data communication net-work for connecting the transaction data receiving unit with the transaction data transmitting unit, when the transaction data includes transaction form information comprised of items representing receipt and payment, transaction pattern information comprised of items representing purchase and sales and having at least merchandise, transaction terms information comprised of at least cash, and predetermined standard management information comprised of predetermined management items for detailed control, corresponding to the transaction form, transaction pattern and transaction terms, and corresponds to a predetermined data format, the method comprising the steps of: transmitting the transaction data to the transaction data receiving unit through the network; determining whether the data transmitted from the transaction data transmitting unit through the network is capable of being received, and determining whether the data is converted into an interpretable and processible code if the data is capable of being received; receipt-processing the received transaction data if the data is determined to be capable of being received in the receipt determining step, and sequentially processing the receipt-processed data according to the processing conditions of the corresponding items of the transaction form, transaction pattern, transaction terms and standard management information concerned with the transaction form, transaction pattern, transaction terms; determining whether the processed transaction data is to be balancing-operated, and displaying normally processed transaction data on the receipt display/input portion if the transaction data is determined to be balance-deducted to then be normally processed; selecting the received transaction data if the data is determined to be capable of being received or being receipt-processed; storing the transaction data including the transaction form, transaction pattern, transaction terms and standard management information concerned with the transaction form, transaction pattern, transaction terms, in the transaction data storage portion if the transaction data is normally processed in the receipt display/input portion; classifying the transaction by generating account information corresponding to the transaction form, transaction pattern, transaction terms and standard management information concerned with the transaction form, transaction pattern and transaction terms, and debit/credit position information, and temporarily storing the generated account information, debit/credit position information and predetermined management information having at least the transaction amount; classifying the temporarily stored accounts information, debit/credit position information and predetermined standard management information having at least the transaction amount into a debit side and a credit side, summing the same, normally processing if the sum of the debit/credit side transaction amount agrees with balancing principles, displaying the journalizing result on the receipt display/input portion, and storing the same in the accounting ledger storage portion; displaying an error message on the receipt display/input portion if the sum of the debit/credit side transaction amount does not agree with balancing principles, determining whether the transaction data is to be balancing-operated among the normally processed transaction data, and temporarily storing account information, debit/credit position information and predetermined standard management information having the transaction amount; searching balance details of the relevant customer for the accounts corresponding to the transaction data from the balance-by-account storage portion if the transaction data is determined to be balance-deducted, comparing the balance details with the data to be balance-deducted, error-processing and displaying if the transaction amount of the transaction data to be balance-deducted is greater than that of the searched balance details, normally processing if the transaction amount of the to-be-balance-deducted transaction data is less than or equal to that of the searched balance details, classifying the transaction data into data to be balance-summed and data to be balance-deducted; searching the balance details of the relevant customer for the corresponding account from the balance-by-account storage portion if the transaction is classified into data to be balance-summed in the classifying step, adding the transaction data to he balance-summed to the balance details, deducting the transaction data to be balance-deducted from the balance details if the data is classified into data to be balance-deducted, and storing the result in the balance-by-account storage portion; and reading the data stored in the accounting ledger storage portion and the balance-by-account storage portion by the user's request, outputting the read data according to a predetermined format to the output unit, and displaying the same on the data receipt display/input unit.

When the transaction data for management control is standardized, formulated and compounded into a predetermined data format to be commonly used throughout all departments of an enterprise for business activities, and the transaction data includes transaction form information comprised of items representing receipt and payment, transaction pattern information comprised of items representing purchase and sales, transaction terms information comprised of predetermined transactions terms having at least cash, and standard management information comprised of predetermined management items for detailed management, corresponding to the transaction form, transaction pattern and transaction terms, and corresponds to a predetermined data format, and that the transaction data storage portion of the data storage unit comprises an integrated management control database for storing the transaction data displayed on the data receipt display/input unit by the received data display processing portion and normally processed, and having databases by management control departments divided according to predetermined management control items, and an integrated accounting database for storing data necessary for an accounting process for financial control, among the data stored in the integrated management control database, the step of storing the transaction data in the transaction data storage portion comprises the substeps of: classifying the transaction data to be stored in the databases for the respective departments of the integrated management control database for integrated control of the transaction data in the management control data is normally processed, and storing the classified data for the respective departments in the corresponding databases; and selectively extracting the transaction data to be account-processed for financial control from the databases for the respective departments of the integrated management control database and storing the same in the integrated accounting database, and the data is read from the integrated accounting database.

Also, the accounting processing method using the data communication network further comprises the steps of: performing sequential processing steps, determining whether there are items suitable to the processing conditions and to be further processed other than compulsory receipt items, and displaying a menu screen for the items to be additionally input on the data receipt display/input unit if there are items to be further processed or deleted by the user after being processed as an error in the journalizing step; and storing the data for the items to be additionally input through the data receipt display/input unit on the data storage unit.

Further, the accounting processing method using the data communication network, further comprises the steps of: displaying the performing of sequential processing steps, determining whether there are items suitable to the processing conditions and to be further processed other than compulsory receipt items, displaying a menu screen for the items to be additionally input on the data receipt display/input unit if there are items to be further processed or deleted by the user after being error processed in the journalizing step; and storing the data for the items to be additionally input through a data receipt display/input unit on the integrated management control database and the integrated accounting database.

The accounting processing method using the data communication network further comprises the steps of: displaying a data input screen on the data receipt display/input unit, for the purpose of receiving the transaction data directly from a user, not from the network; and storing the transaction data in the transaction data storage portion if the displayed transaction data is input through the data receipt display/input unit.

The data input screen displaying step comprises the steps of: displaying payment and receipt items corresponding to a transaction form on the screen of the data receipt display/input unit; displaying purchasing, warehousing, fund expenditure, financial transfer payment items corresponding to transaction patterns on the screen of the data receipt display/input unit if the payment item is selected in the transaction form displaying step as the transaction form, and displaying sales, delivery, fund revenue, financial transfer receipt items corresponding to transaction patterns on the screen of the data receipt display/input unit if the receipt item is selected in the transaction form displaying step as the transaction form; displaying a predetermined detailed item corresponding to the selected transaction pattern and decided according to accounting principles on the screen of the data receipt display/input unit, if the transaction pattern is selected in the transaction pattern displaying step; displaying at least one or more standard management items corresponding to the detailed item on the screen of the data receipt display/input unit to then be selected and input, if the detailed item concerned with the transaction pattern is selected in the detailed pattern displaying step; determining whether the transaction to be balancing-operated is to be balance-deducted, according to the transaction form, transaction pattern, detailed pattern and standard management information, respectively selected and input in the transaction form displaying step and detailed pattern displaying step; selecting transaction terms including cash, bank deposit, note, credit and adjustment items and displaying a transaction terms menu screen for inputting the transaction amount corresponding to the selected transaction terms item on the screen of the data receipt display/input unit if the transaction to be balancing-operated is determined in the transaction to be balancing-operated determining step to not be balance-deducted, and if the transaction to be balancing-operated is determined to be balance-deducted, notifying that the target data is to be balancing-operated, reading the balance details of the relevant customer for the corresponding account from the balance-by-account storage portion to then be displayed on the data receipt display/input unit, and displaying the transaction terms menu screen on the data receipt display/input unit; and displaying standard management information including bank codes for bank deposit item and including customers, management periods and bank codes for credit and note items if the bank deposit, credit and note items are selected and input in the transaction terms displaying step as the transaction terms.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Hereinbelow, preferred embodiments of the present invention will be described in detail with reference to accompanying drawings.

Figure 5:
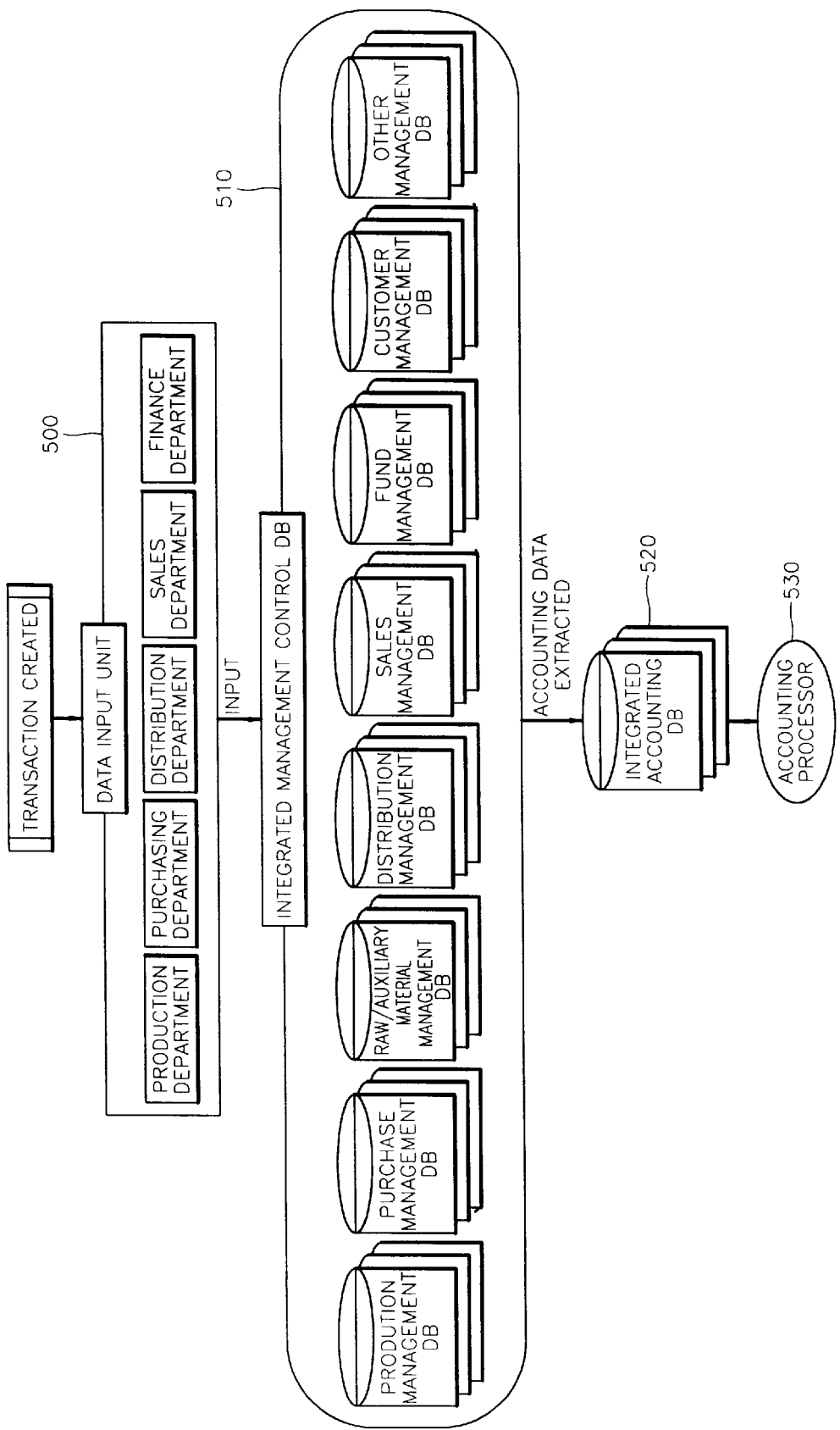
FIG. 5 is a block diagram of the overall structure of a preferred system to which the present invention is applied.

FIG. 5 is a block diagram of the overall structure of a preferred system to which the present invention is applied, which includes a data input portion 500, an integrated management control database 510 connected to the data input portion 500 through a network, an integrated accounting database 520 for selectively extracting the transaction data concerned with accounting for financial management among the data stored in the integrated management control database 510 and storing the same, and an accounting processor 530 for account-processing the data stored in the integrated accounting database 520.

For reference, as a method for inputting the transaction data created by a transaction between enterprises into the system, a user may input the data directly using a keyboard. Otherwise, the transaction data created between enterprises or various departments of an enterprise may be input by receiving the same through a network.

The data input portion 500 may exist in the respective departments independently. If a transaction is created in a series of business activities including production, purchase, sales, distribution and fund management, the transaction data for the respective departments is stored in the integrated management control database 510 connected through the network such that users of the respective departments simply select a menu through a transaction data menu screen produced in accordance with the standardized, formulated and compounded transaction data format, or input the transaction data. Here, the network connects various departments of the enterprise and allows the transaction data created by the enterprise's business activities to be shared by the respective departments. Among the data stored in the integrated management control database 510, the transaction data concerned with the accounting for financial management is selectively extracted to then be stored in the integrated accounting database 520 to be account-processed, and can he shared through the network. The integrated management control database 510 and the integrated accounting database 520 may be replaced with a transaction data storage portion in which only the transaction data concerned with accounting for financial management is stored depending on system environments. Also, the transaction data stored in the transaction data storage portion is account-processed to be shared through the network.

The integrated management control database 510 includes databases for the respective departments of the enterprise, including a production management database, a purchase management database, a raw/auxiliary material management database, a sales management database, a distribution management database, a customer management data base, and a fund management database. The respective databases of the integrated management control database 510 may increase or decrease according to business volume and management control activities, and are not limited to those as shown in FIG. 5.

The integrated accounting database 520 stores only data necessary for an accounting process among the data stored in the databases for the respective departments of the integrated management control database 510.

The accounting processor 530 accesses the integrated accounting database 520 through the network, and account-processes the accounting data. The network refers to a io general network which can transmit and receive data, such as a local area network (LAN), a wide area network (WAN), a dedicated network, or a public communication network, but is not limited to a specific network. Also, the system used for the accounting processor 530 connected to the network may employ a typical general-purpose computer system.

When the data input through the data input screen of the data input device 500 is stored in the integrated management control database 510, the data is converted into a standardized, formulated and compounded data format to be commonly used throughout the whole management control departments.

Tables 1 through 4 are demonstrated in the present invention for explaining a method for generating data by standardizing, formulating and compounding the transaction which can be created during business activities of an enterprise.

TABLE 1

| Transaction form | Transaction pattern Pattern | Detailed pattern | Standard management information of transaction pattern and terms | Transaction terms Terms | |
|---|---|---|---|---|---|
| Payment | Purchase Warehousing Fund Expenditure Financial transfer payment | See Table 2 | See table 3 | Cash Bank deposit Note | Percentage (%)/Amount |
| Receipt | Sales Delivery Fund revenue Financial transfer receipt | | | Credit Offset | |

As demonstrated in Table 1, in the method for standardizing, formulating and compounding the transaction created during the business activities, the transaction is largely divided into a transaction form, a transaction pattern, transaction terms and standard management information corresponding to the transaction form, transaction pattern and transaction terms. The transaction form is divided into two items of receipt and payment, and the transaction pattern is divided into 8 items of purchase, warehousing, fund expenditure, financial transfer payment, sales, delivery, fund revenue, financial transfer receipt.

TABLE 2

| Purchase | Warehousing | Fund expenditure | Financial transfer payment |
|---|---|---|---|
| Merchandise | Finished goods | Construction expenses | Receipt of note receivable |
| Raw materials | Semi-finished goods | R&D expenses | Creation of accrued amount |
| Supplies | Work in-process | Advances | Refund of allowances |
| Tangible non-current assets | Raw material transfer | Rent deposit guaranty | Transfer of advance received |
| Intangible non-current assets | | Debt redemption | Redemption of reserves |
| Securities | | Expired note redemption | Appraisal loss on foreign currency |
| Investment assets | | Amount in arrear Bank deposit | Appraisal loss on securities Redemption of deferred assets |
| | | Deposit guaranty redemption Credit purchase money payment Undelivered goods purchase money Undelivered machine purchase money Labor expenses Interest Extra expenses Dividend Capital decrease | |

| Sales | Delivery | Fund revenue | Financial transfer receipt |
|---|---|---|---|
| Merchandise | Inventory movement to warehouse | Collect of note receivable | Issuance of note |
| Finished goods | Inventory put into production | Collection of accrued amount | Creation of amount in arrear |
| Supplies | Inventory expenses transfer | Collection of rent deposit guaranty | Establishment of allowances |
| | | Collection of loan | Accumulation of reserves |
| | | Withdrawal of bank deposit | Assets transfer of undelivered goods |
| | | Collection of credit sales money | Assets transfer of undelivered machines |
| | | Interest revenue | Assets transfer of construction expenses |
| | | Dividend revenue | Receipt of manufacturing cost assets |
| | | Rent fee revenue | Appraisal profit on foreign currency |
| | | Commission revenue | Appraisal profit on securities |
| | | Debt revenue Deposition of guaranty Sale of tangible non-current assets Sale of Intangible non-current assets Sale of securities Sale of investment assets Fund input | |

Table 2 indicates 8 detailed items of the transaction pattern. The detailed items of the transaction pattern can be added or changed according to the business volume and management method. The transaction terms are divided into 5 terms of cash, bank deposit, note, credit and offset, which may be added or excluded according to country accounting basis. If the transaction terms are selected, the selected terms are indicated by percentage or amount.

TABLE 3

| Code | Standard management information | Byte size | Code | Standard management information | Byte size | Code | Standard management information | Byte size |
|---|---|---|---|---|---|---|---|---|
| A01 | Supply amount | 15 | B27 | Resident registration number | 13 | C29 | Investment classification code | 3 |
| A02 | Tax imposition standard | 15 | B28 | Unsettled offset number | 8 | C30 | Investment purpose/class code | 4 |
| A03 | Par amount | 15 | B29 | Phone number | 16 | C31 | Investment supply code | 4 |
| A04 | Cost | 15 | B30 | Credit card number | 19 | C32 | Domestic sale/export classification code | 2 |
| A05 | Value added tax | 15 | B31 | Merchandise coupon number | 7 | C33 | Computer feature code | 3 |
| A06 | Amount | 15 | " | Merchandise coupon number | | C34 | Debt source code | 7 |
| A07 | Unit price | 15 | " | Merchandise coupon number | | C35 | Client code | 9 |
| " | " | | C01 | Development PJT code | 11 | " | " | |
| " | " | | C02 | Assets classification code | 5 | D01 | Bill date | 6 |
| B01 | Merchandise coupon number | 7 | C03 | Facility/mold code | 14 | D02 | Period | 13 |
| B02 | Export L/C number | 24 | C04 | Goods code | 5 | D03 | Transaction date | 6 |
| B03 | Local L/C number | 15 | C05 | Model code | 16 | D04 | Expected receipt/payment date | 3 |
| B04 | Permit letter number | 15 | C06 | Goods group code | 5 | D05 | Issue date | 6 |
| B05 | P/O number | 15 | C07 | Debt pattern code | 7 | D06 | Maturity date | 6 |
| B06 | I/V number | 15 | C08 | Line/progress code | 2 | D07 | Period of deferment and redemption | 4 |
| B07 | Sample shipment number | 14 | C09 | Development feature code | 2 | D08 | Negotiation date | 6 |
| B08 | Exempted tax coupon number | 7 | C10 | Processing cost pattern code | 2 | D09 | License date | 6 |
| B09 | Delivery number | 15 | C11 | Distribution route code | 2 | D10 | Depreciation years | 2 |
| B10 | Non-current assets number | 13 | C12 | Business project code | 10 | D11 | Shipment date | 6 |
| B11 | Construction price account number | 15 | C13 | Business site/department code | 5 | " | " | |
| B12 | Invested goods number | 11 | C14 | Depositor code | 13 | " | " | |
| B13 | Import L/C number | 15 | C15 | Payment accounting unit code | 3 | F01 | Bounty pattern | 1 |
| B14 | B/L number | 16 | C16 | Assigned accounting unit code | 3 | F02 | Bond receipt pattern | 2 |
| B15 | Customs declaration number | 12 | C17 | Evidence classification code | 1 | F03 | Dimension | 25 |

TABLE 3-continued

| Code | Standard management information | Byte size | Code | Standard management information | Byte size | Code | Standard management information | Byte size |
|---|---|---|---|---|---|---|---|---|
| B16 | File number | 8 | C18 | ? | 2 | F04 | Unit | 2 |
| B17 | Account number | 15 | C19 | Congratulations & condolences expenses code | 4 | F05 | Interest rate | 8 |
| B18 | Debit number | 9 | C20 | Local tax code | 2 | F06 | Created exchange rate | 9 |
| B19 | A/S reservation number | 16 | C21 | Bank code | 6 | F07 | Reimbursed exchange rate | 9 |
| B20 | A/S receipt number | 8 | C22 | Customer code | 10 | F08 | Number of evidence sheets | 5 |
| B21 | Employee's number | 9 | C23 | Assigned district code | 2 | F09 | Issuance or non-issuance of bills | 1 |
| B22 | Note serial number | 8 | C24 | Country code | 2 | F10 | Number of times | 9 |
| B23 | Securities number | 12 | C25 | Counter-party's account code | 7 | F11 | Quantity | 5 |
| B24 | Withholding tax number | 7 | C26 | Currency code | 3 | F12 | Type of note | 1 |
| B25 | Tax bill number | 10 | C27 | Warehouse code | 3 | " | | |
| B26 | Business registration number | 13 | C28 | Duty code | 3 | " | | |

Figure 1:
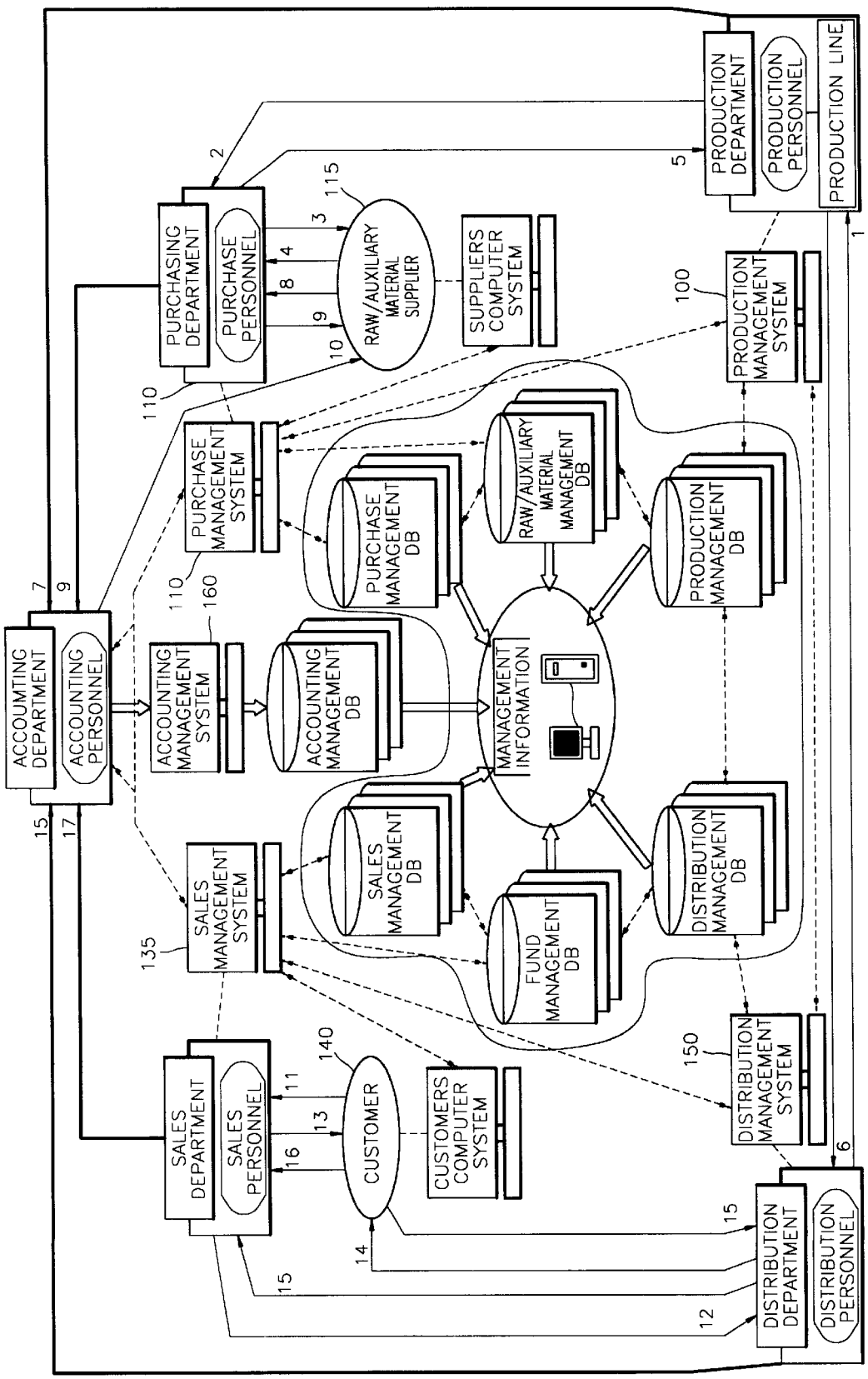
FIG. 1 shows a process sequence from transaction creation of an enterprise to accounting process, illustrating a typical transaction flow and a computerized accounting procedure flow according to computerized business activities of a manufacturer.
Figure 2:
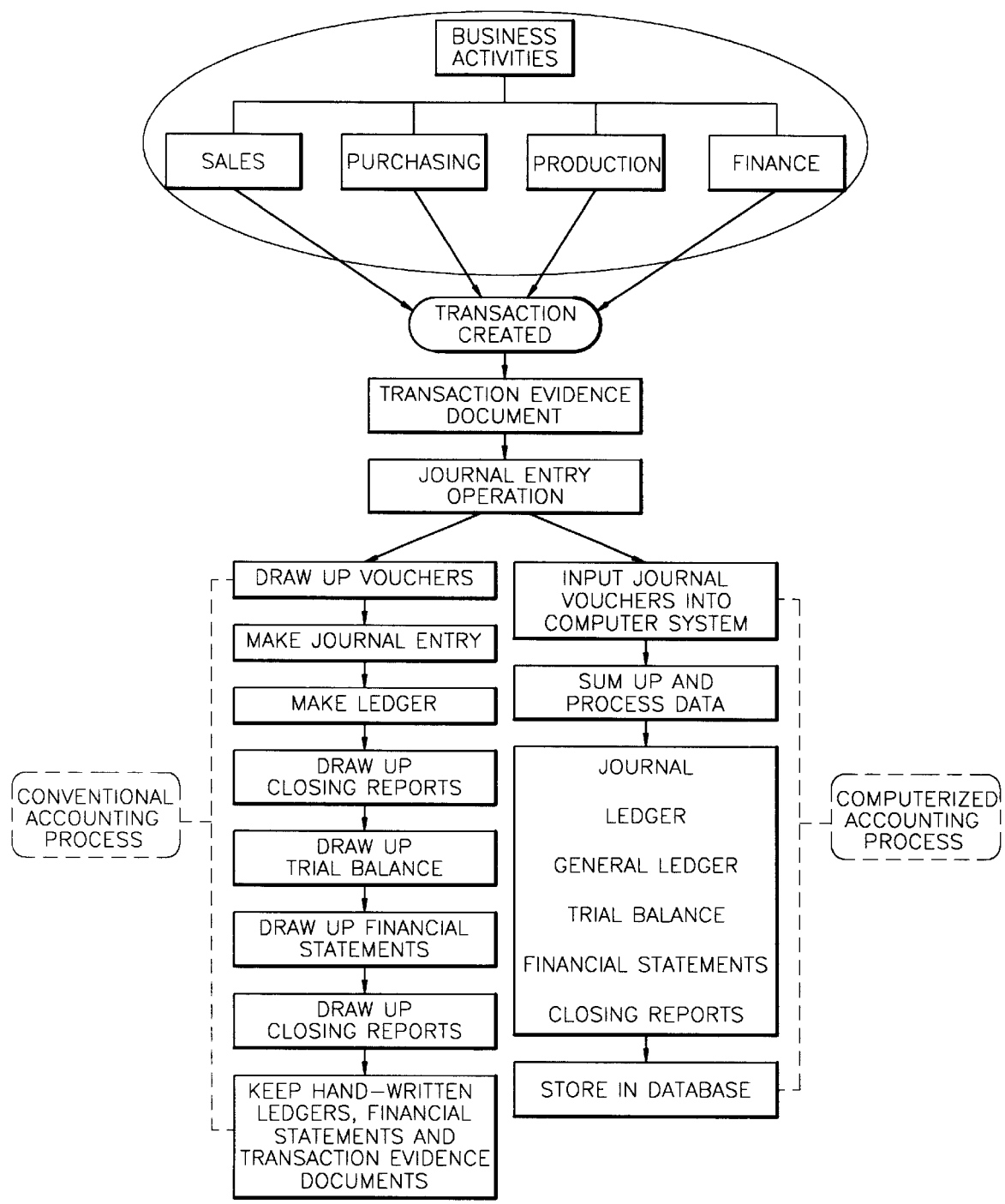
FIG. 2 shows a series of accounting circulations according to a created transaction.
Figure 3:
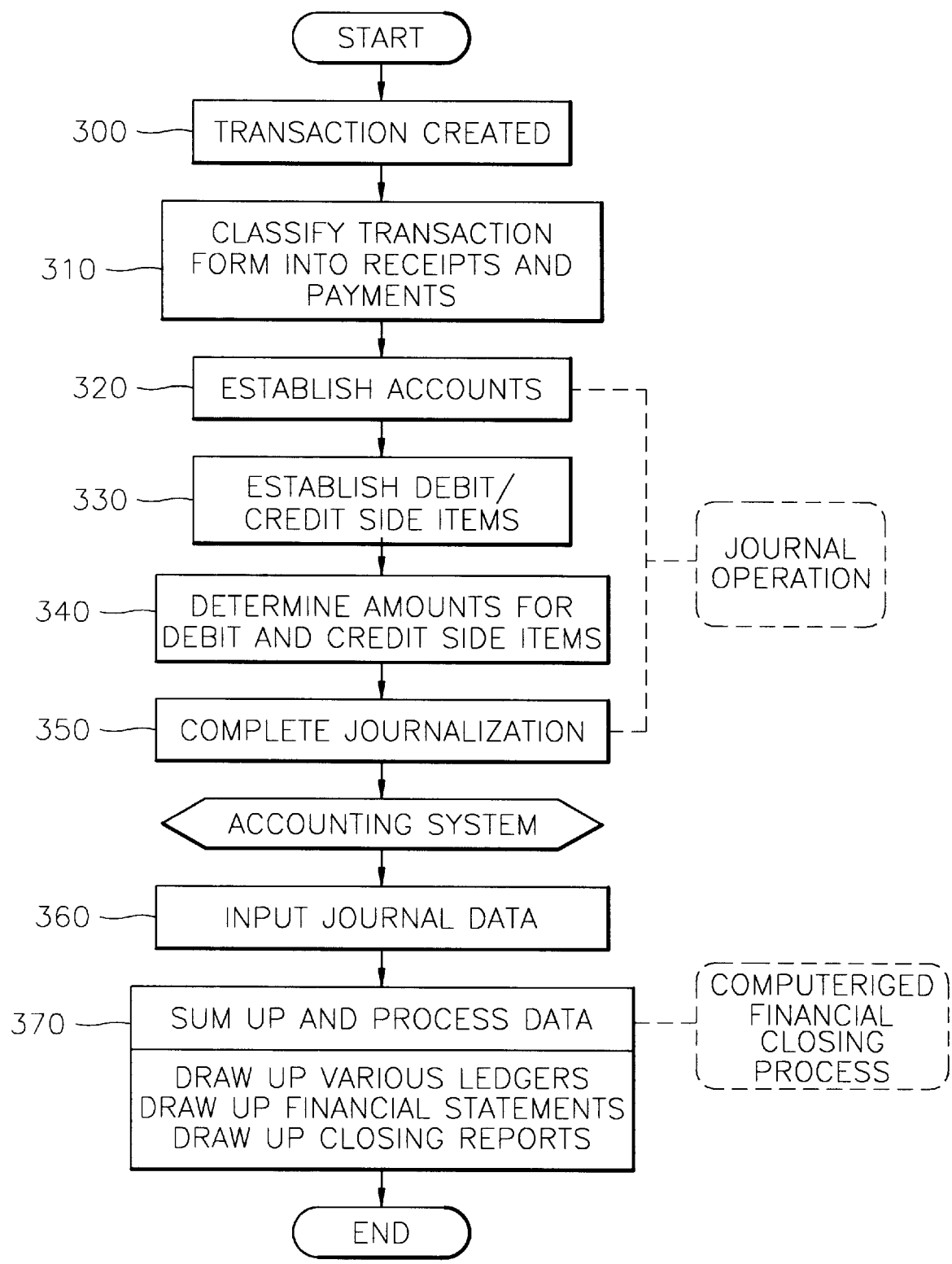
FIG. 3 shows a general accounting process, i.e., a flow diagram of a journalizing process.
Figure 4:
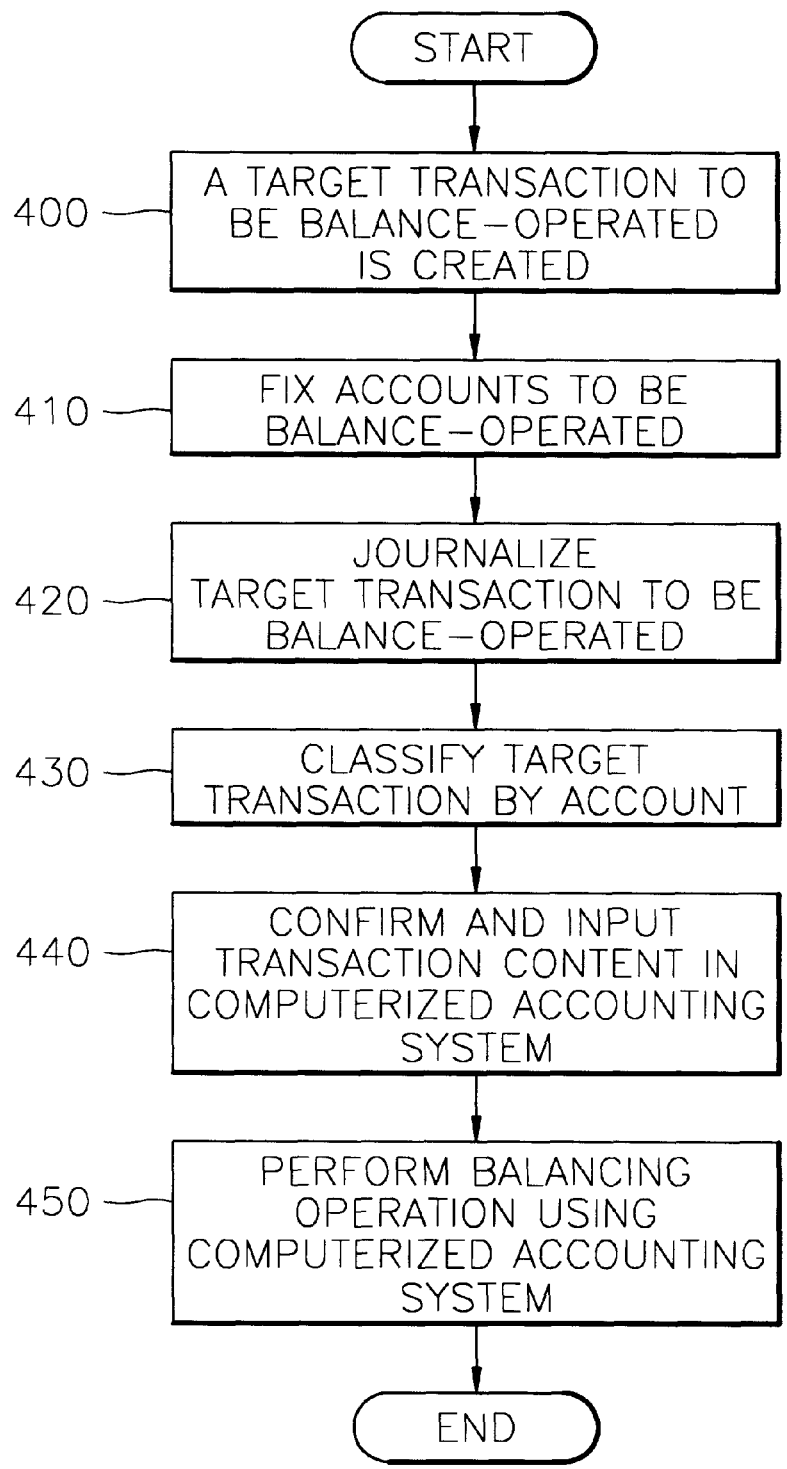
FIG. 4 is a flow diagram of a general procedure of the balancing operation in an accounting process.

Table 3 indicates standard management information, which corresponds to the transaction pattern and the transaction terms. In other words, if the transaction pattern is determined, the items to be managed accordingly are the standard management information corresponding to the transaction pattern. If the transaction terms are determined, the items to be managed accordingly are the standard management information corresponding to the transaction terms. For example, if the transaction pattern is determined as purchase, predetermined standard management information including a customer code and a merchandise code is displayed. This is also true of the standard management information corresponding to the transaction terms. The standard management information may be deleted or added according to the business volume and management activities, but is not limited to those indicated in FIG. 3. Also, the codes shown in Table 3 are largely divided into groups A through F, respectively representing amounts, numbers, codes, dates and others.

TABLE 4

Classification of debits/credits
↓
| Transaction form | Transaction pattern | Standard management information | Transaction terms |

Classification of accounts
↓
Debit/credit classification for transaction form and pattern

| Class | Debit | Credit |
|---|---|---|
| Transaction form | Payment | Receipt |
| Transaction pattern | Purchase Warehousing Fund expenditure | Sales Delivery Fund revenue |

TABLE 4-continued

| | Financial transfer payment | | Financial transfer receipt | |
|---|---|---|---|---|

Determination of debit/credit position and accounts according to transaction pattern and transaction terms

| | Payment as transaction form | | Receipt as transaction form | |
|---|---|---|---|---|
| | Debit | Credit | Debit | Credit |
| Transaction pattern | Purchasing Warehousing Fund expenditure Financial transfer payment | Transaction terms | Cash Bank deposit Note Credit Offset | Transaction terms | Cash Bank deposit Note Credit Offset | Transaction pattern | Sales Delivery Fund revenue Financial transfer receipt |

Table 4 shows an example of determining debit/credit position and accounts, divided according to the transaction form, transaction pattern, standard management information and transaction terms, which will now be described.

Classification into debit and credit sides is determined by the transaction form and transaction terms. If the transaction form is classified as a debit side, the transaction terms corresponding to the transaction form are determined as a credit side. If the transaction form is classified as a credit side, the transaction terms corresponding to the transaction form are determined as a debit side. For example, if the transaction form is payment, the transaction pattern including purchase, warehousing, fund expenditure and financial transfer payment is classified as the debit side, and the transaction terms is classified as the credit side. On the contrary, if the transaction form is receipt, the transaction pattern including sales, delivery, fund revenue and financial transfer receipt is classified as the credit side, and the transaction terms is classified as the debit side.

Accounts are divided by a transaction pattern, transaction terms and standard management information. In more detail, as demonstrated in Table 2, the accounts may be determined as the detailed items for the transaction pattern, or as those for the standard management information. Also, the accounts may be determined by referring to the detailed pattern and the customer information of the standard management information. Further, the accounts may be determined by referring to the transaction form and transaction terms.

The standard management information will now be described in more detail with reference to Tables 3 and 4. If the payment item is selected as the transaction form and the sales and merchandise items are selected as the transaction pattern, standard management information including customer, transaction date, merchandise code, quantity and cost are displayed on a menu screen to then be selected and input. If the credit item is selected as the transaction terms, predetermined standard management information including currency code and expected payment date is displayed on the menu screen to then be selected and input. Selection of a customer is a classified item for determining whether the sales of merchandise is for domestic sales or export. If the customer is an overseas client and the payment terms is credit, debit/credit information and accounts are generated and determined as foreign currency credit sales amount at he debit side and as merchandise sales at the credit side. Composition and processing method of the standard management information may be employed arbitrarily according to business volumes and business management activities, depending on the management standards and conditions corresponding to the transaction type, transaction pattern and transaction terms. The manufacturing cost of the production department, the sales management cost of the sales department and the general management cost of the general administration department are divided by department codes, product codes and model code to which the standard management information is attributed. The common cost which cannot be attributed directly to any item is systemized according to the enterprise's delivery standards, and is automatically delivered and attributed to a delivery department, delivered product and delivered model to then be stored. Also, the cost by product and model can be automatically calculated by searching and extracting the corresponding cost data stored in the respective databases using the department codes, product codes and model codes.

Figure 6:
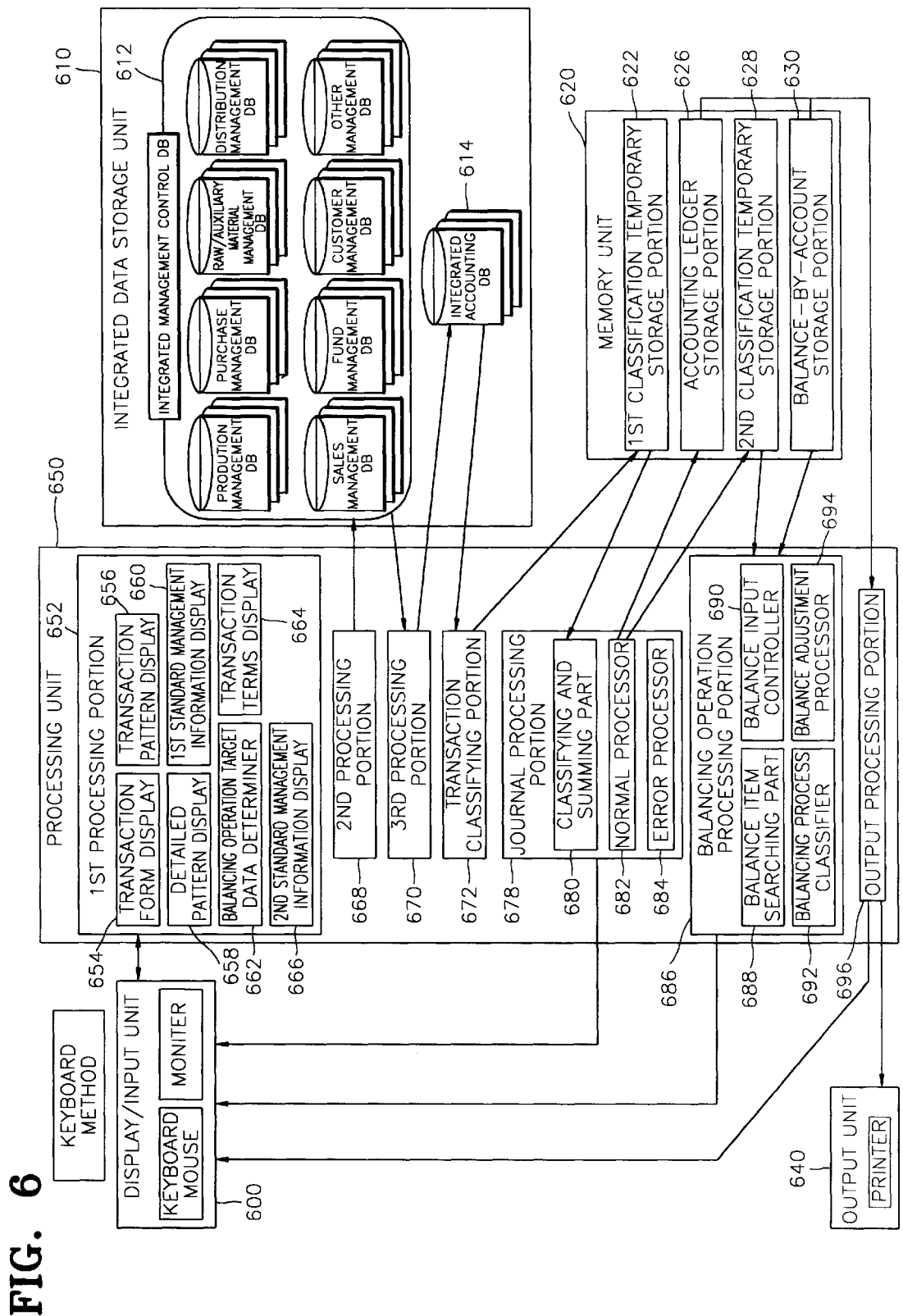
FIG. 6 is a block diagram of an accounting processor system according to a preferred embodiment of the present invention.

FIG. 6 is a block diagram of an accounting processor system according to a preferred embodiment of the present invention, which includes a display/input unit 600, an integrated data storage unit 610, a memory unit 620, an output unit 640, and a processing unit 050.

The display/input unit 600 corresponding to the data input device 500 of FIG. 5, displays an input screen of standardized, formulated and compounded data by the command of the processing unit 650, for sequentially inputting the transaction data created during business activities, which allows a user to select at least one or more menu items supplied from the displayed input screen, or input the transaction data. Preferably, a CRT, an LCD, a keyboard, a mouse or a pointing device is used as the display/input unit 600.

The integrated data storage unit 610 stores the data necessary for standardized, formulated and compounded management control and accounting process, and includes an integrated management control database 612 and an integrated accounting database 614.

The integrated management control database 612 corresponding to the integrated management control data base 510 of FIG. 5, includes a production management database for storing data necessary for production management, a purchase management database for storing data necessary for purchase management, a distribution management database for storing data necessary for management of merchandise and other materials, a sales management database for storing data necessary for sales management of finished goods and merchandise, a customer management database for storing data necessary for customer management, a fund management database for storing data necessary for fund management, and other management database for storing data necessary for other management.

The integrated accounting database 614 corresponding to the integrated accounting database 520 of FIG. 5, stores the transaction form, transaction pattern, transaction terms and standard management information, necessary for an accounting process, extracted by the command of the processing unit 650, among the transaction information stored in the integrated management control database 612. In the integrated data storage unit 610, the transaction data concerned with business activities is stored in the integrated management control database 612, and the transact on data is extracted and stored in a transaction data storage portion for storing only the accounting-related transaction data necessary for financial management, not in the integrated accounting database 614. Also, according to enterprise circumstances, the integrated data storage unit 610 may be an auxiliary storage device, which is directly accessible without passing through the network, and preferably may be a hard disk, a magnetic tape or an optical disk. In other words, the integrated data storage unit 610 does not restrict the present invention by the business volume and accessing method.

The memory unit 620 for storing data created during the accounting process, is connected to the processing unit 650 and includes a first classification temporary storage portion 622, an accounting ledger storage portion 626, a second classification temporary storage portion 628, and a balance-by-account storage portion 630.

The first classification temporary storage portion 622 classifies the transaction data read from the integrated accounting database 614 by the command of the processing unit 650 and temporarily stores account information, debit/credit information and predetermined standard management information having transaction amount. The accounting ledger storage portion 626 stores the account-processed accounts information, debit/credit information and predetermined standard management information having transaction amount. The second classification temporary storage portion 628 temporarily stores the transaction data to be balancing-operated by the command of the processing unit 650. The balance-by-account storage portion 630 stores balance details corresponding to the balancing-operated accounts information and the standard management information having the transaction amount.

The processing unit 650 for account-processing the created transaction includes a first processing portion 652, a second processing portion 668, a third processing portion 670, a transaction classifying portion 672, a journal processing portion 678, a balancing operation processing portion 686 and an output processing portion 696.

The first processing portion 652 is a module for displaying a transaction data input screen for the standardized, formulated and compounded transaction form, transaction pattern, transaction terms and standard management information concerned therewith, on the display/input unit 600, and includes a transaction form display 654, a transaction pattern display 656, a detailed pattern display 658, a first standard management information display 660, a balancing operation target data determiner 662, a transaction terms display 664, and a second standard management information display 666.

The transaction form display 654 displays payment and receipt items corresponding to the transaction form on a menu screen of the display/input unit 600, as indicated in Table 1.

The transaction pattern display 656 displays purchase, warehousing, fund expenditure, financial transfer payment items corresponding to transaction patterns on the screen of the display/input unit 600 if the payment item is selected from the transaction form display 654 as the transaction form, and displays sales, delivery, fund revenue, financial transfer receipt items corresponding to transaction patterns on the screen of the display/input unit 600 if the receipt item is selected by the transaction form display 654 as the transaction form.

The detailed pattern display 658 displays predetermined transaction pattern details which correspond to the selected transaction pattern and is decided according to accounting principles on the screen of the display/input unit 600, if the transaction pattern is selected by the transaction pattern display 656. An example of the detailed items of the predetermined transaction pattern is demonstrated in Table 2.

The first standard management information display 660 displays at least one or more standard management items corresponding to the detailed item on the screen of the display/input unit 600 to then be selected and input, if the detailed item concerned with the transaction pattern is selected by the detailed pattern display 658. The standard management information of at least one or more items corresponding to the transaction pattern is demonstrated in Table 3.

The balancing operation target data determiner 662 determines whether transaction to be balancing-operated transaction is to be balance-deducted, according to the transaction form, transaction pattern, detailed pattern and standard management information, respectively selected and input from the transaction form display 654, transaction pattern display 656, detailed pattern display 658 and first standard management information display 660.

The transaction terms display 664 selects transaction terms corresponding to cash, bank deposit, note, credit and offset and displays a transaction terms menu screen for inputting the transaction amount corresponding to the selected transaction terms item on the screen of the display/input unit 600, if the transaction to be balancing-operated transaction is determined by the balancing operation target determiner 662 to not be balance-deducted.

If the offset item is selected in the balancing operation target data determiner 662, the transaction data is determined as the target data to be balancing-operated according to the standard management information concerned with the offset item.

If the transaction to be balancing-operated is determined to be balance-deducted in the balancing operation target data determiner 612, it is notified to the balancing operation processing portion 686 that the target data is to the balancing-operated. The balance item searching part 688 in the balancing operation processing portion 686 reads the balance details of the relevant customer determined as the balancing operation target and concerned with the transaction from the balance-by-account storage portion 630 and then displays the same in the display/input unit 600. Then, the transaction terms display 664 displays the transaction terms menu screen on the display/input unit 600.

The second standard management information display 666 displays at least one or more standard management items corresponding to the transaction terms on the display/input unit 600, if the transaction terms item is selected and the transaction terms type is selected and input. The standard management information corresponding to the transaction terms is demonstrated in Table 3.

The second processing portion 668 classifies the transaction data selected and input through the display/input unit 600 to be stored in the databases for the respective departments of the integrated management control database 612 and stores the classified data for the respective departments in the corresponding databases.

The third processing portion 670 selectively extracts only the transaction data necessary to be account-processed for financial control from the databases for the respective departments of the integrated management control database 612 and stores the extracted data in the integrated accounting database 614.

The transaction classifying portion 672 is a block for automatically generating and determining account information and debit/credit information, and for classifying and summing up the transaction data, extracts the transaction form, the transaction pattern, the transaction terms and the standard management information concerned therewith from the transaction data stored in the integrated accounting database 614, automatically generates and determines the account information and debit/credit position information corresponding to the extracted transaction data, and temporarily stores the generated account information and debit/credit position information and predetermined standard management information including the transaction amount. Table 4 illustrates an example of generating and determining the account information and debit/credit position information using the transaction form, transaction Pattern and transaction terms. The explanation thereof has been described above.

The journal processing portion 678 for performing an automatic journal entry on the transaction data, includes a classifying and summing part 680, a normal processing portion 682 and an error processor 684.

The classifying and summing part 680 extracts the account information, debit/credit position information and predetermined standard management information comprised of the transaction amount stored in the first classification temporary storage portion 622, classifies the extracted transaction data into a debit side and a credit side, sums up the same, notifies it to the normal processor 682 if the classified and summed data agrees with balancing principles, and notifies it to the error processor 684 if otherwise. The =normal processor 682 displays the journalizing result of the classifying and summing part 680 on the display/input unit 600 if the sum of the debit/credit side transaction amount agrees with balancing principles, stores the transaction data in the accounting ledger storage portion 626. Also, the normal processor 682 determines transaction data to be balancing-operated, and stores the determined data in the second classification temporary storage portion 628. The error processor 684 displays an error message on the display/input unit 600 if the sum of the debit/credit side transaction amount of the classifying and summing portion 680 does not agree with balancing principles, and deletes the corresponding error data input from the display/input unit 600 or corrects the corresponding error data by a user's determination.

The balancing operation processing portion 686 reads the balance details to be balance-deducted from the balance-by-account storage portion 648 to then display the same on the display/input unit 600, or reads the data to be balancing-operated data stored in the second classification temporary storage portion 628 from the balance-by-account storage portion 630 and performs a balancing operation thereon, and stores the result in the balance-by-account storage portion 630. The balancing operation processing portion 686 includes a balance details searching portion 688, a balance input controller 690, a balancing process classifier 692, and a balance adjustment processor 694.

The balance details searching portion 688 operates when the transaction data is determined to be balance deducted in the balancing operation target data determiner 662 of the first processing portion 652, extracts the accounts, customer and balance details corresponding to the transaction form, transaction pattern and the predetermined standard management information comprised of the transaction amount, from the balance-by-account storage portion 630, and displays the extracted data on the display/input unit 600. The balance input controller 690 displays an error message on the display/input unit 600 if the transaction amount is larger than the corresponding balance amount extracted by the balance item search portion 688 and displayed on the display/input unit 600, deletes the data input through the display/input device 600 or corrects the error data, according to the user's determination.

The balancing process classifier 692 reads the data to be balancing-operated temporarily stored in the second classification temporary storage portion 628 and classifies the transaction data into data to be balance-summed and data to be balance-deducted. The balance adjustment processor 694 deducts the transaction amount to be balance-deducted from the balance details of the balance-by-account storage portion 630 if the transaction data is determined to be balance-deducted, and sums the transaction amount to be balance-summed to the balance details of the balance-by-account storage portion 630 if the transaction data is determined to be balance-summed.

The output processing portion 696 reads the data necessary to output and display financial information including financial statements having a predetermined format, from the accounting ledger storage portion 626 and the balance-by-account storage portion 630, and outputs the same to the output unit 640 and display/input unit 600.

The output unit 640 outputs the financial information including financial statements having a predetermined format after the accounting process of the transaction. The output unit 640, preferably, a printer or monitor, is connected to the processing unit 650.

Figure 7:
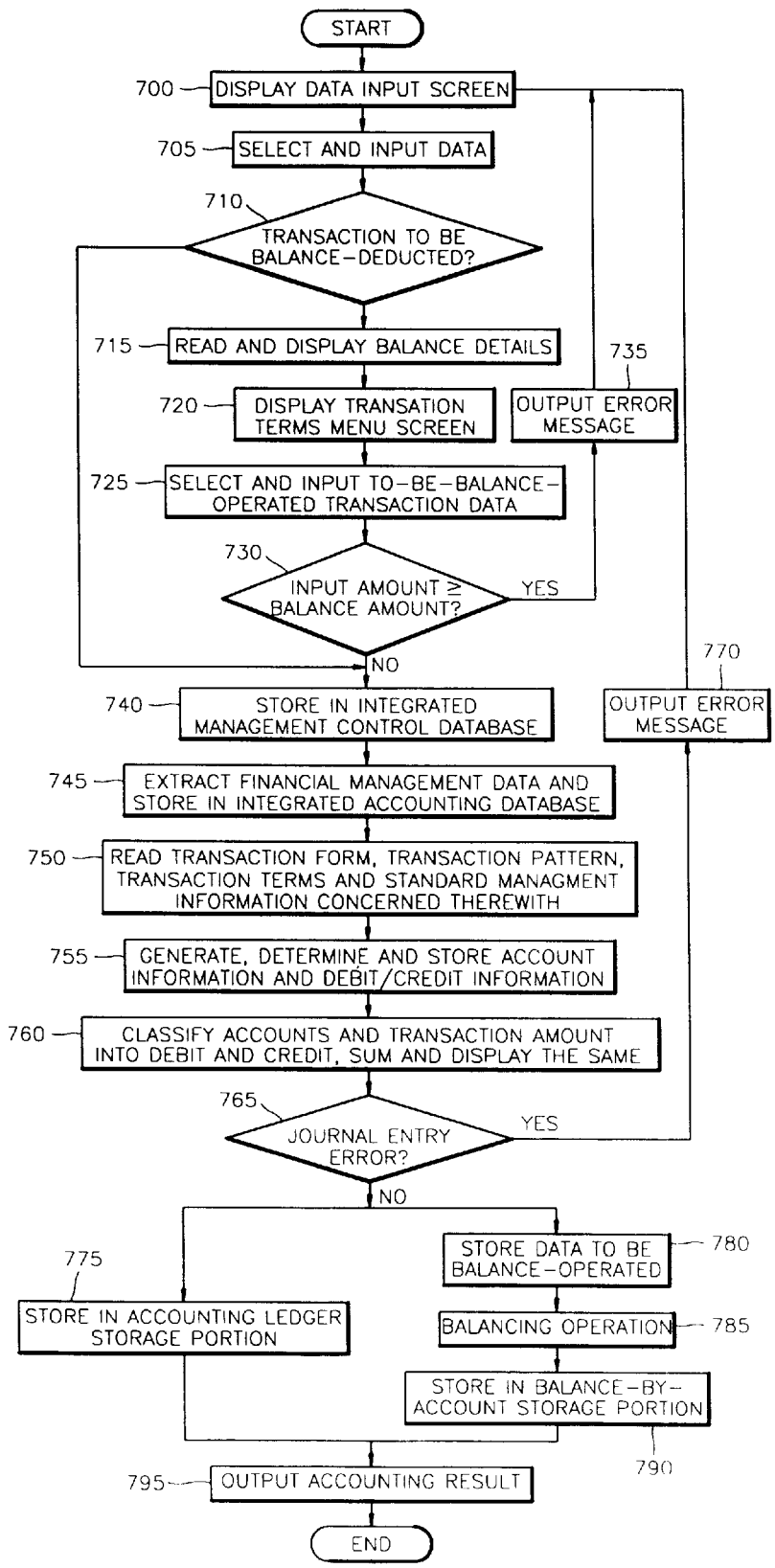
FIG. 7 is a flow diagram of the operation of the preferred embodiment of the present invention.

FIG. 7 is a flow diagram of the operation of the preferred embodiment of the present invention, which will now be described.

First, in order to receive the standardized, formulated and compounded data for management control, a data input screen is displayed on the display/input unit 600 by the command of the first processing portion 652 step 700). From the data input screen, a transaction form menu, a transaction pattern menu, a detailed item menu for the transaction pattern, a first standard management information menu, a transaction terms menu, and a second standard management information menu are supplied. The transaction form menu is displayed by the transaction form display 654 and is supplied for receiving the data concerned with the transaction form. The transaction pattern menu is displayed by the transaction pattern display 656 and is supplied for receiving the data concerned with the transaction pattern. The detailed item menu for the transaction pattern is displayed by the transaction detailed pattern display 658 and is supplied for receiving the data concerned with the detailed item for the transaction pattern. The first standard management information menu is displayed by the first standard management information display 660 and is supplied for receiving the standard management information data of at least one item, corresponding to the detailed pattern, according to the selection of the detailed pattern display 658. The transaction terms menu is displayed by the transaction terms display 664 and is supplied for receiving the data concerned with the transaction terms. The second standard management information menu is displayed by the second standard management information display 666 and is supplied for receiving the data concerned with the standard management information data of at least one item corresponding to the transaction terms, according to the selection of the transaction terms display 664.

If a user selects and inputs management control data through the menu screen of the display/input unit 600 (step 705), the balancing operation target determiner 662 checks whether the transaction data to be balancing-operated is to be balance-deducted (step 710). If the transaction data is to be balance-deducted, the balance details of the relevant customer for the account stored in the balance-by-account storage portion are displayed on the display/input unit 600 (step 715). The transaction terms display 664 displays the transaction terms menu screen on the display/input unit 600 (step 720). Then, the display balance details are selected or the transaction data to be balancing-operated is input (step 725). At this time, the balance input controller 690 compares the input transaction amount with the balance amount read and displayed (step 730). If the input transaction amount is larger than the balance amount, an error message is output for error-processing (step 735). If the input transaction amount is smaller than or equal to the balance amount, the input transaction data is received by the first processing portion 652.

If the transaction data is input through the display/input unit 600, the data is stored in the databases for the respective departments in the integrated management control database 612 for integrally controlling the transaction data, by means of the second processing portion 668 (step 740). The transaction data concerned with an accounting process is selectively extracted from the databases for the respective departments in the integrated management control database 612 by means of the third processing portion 670, to then be stored in the integrated accounting database 614 (step 745).

The data including the transaction form, transaction pattern, transaction terms and standard management information is read from the integrated accounting database 614 through the transaction classifying portion 672 (step 750). The accounts and debit/credit position corresponding to the read data are generated and determined, and then the determined account information, debit/credit information and standard management information having transaction amount are temporarily stored in the first classification temporary storage portion 622 (step 755).

The data stored in the first classification temporary storage portion 622 is classified and summed up by accounts and debit/credit sides in the journal processing portion 678 (step 760). As the journalization result of the journal processing portion 678 if the predetermined standard management information data including account information, debit/credit information and transaction amount is not accordance with balancing principles (step 765), an error message is displayed on the display/input unit 600 (step 770). If there is no error (step 765), the predetermined standard management information data including account information, debit/credit information and transaction amount is stored in the accounting ledger storage portion 626. Also, the journal processing portion 678 extracts the data to be balancing-operated among the normally processed transaction data and temporarily stores the same in the second classification temporary storage portion 628 (step 780). The transaction data to be balancing-operated stored in the second classification temporary storage portion 628 is read by the balancing process classifier 692, the read transaction data is classified into data to be balance-summed or data to be balance-deducted, the data to be balance-summed is summed to the balance details of the relevant customer for the corresponding account if the transaction data is determined to be balance-summed, and the data to be balance-deducted is deducted from the balance details (step 785). The balance-summed or balance-deducted data of the balance adjustment processing portion 694 is stored in the balance-by-account storage portion 630 (step 790). Finally, upon user's request, the data stored in the accounting ledger storage portion 649 and the balance-by-account storage portion 648 is read to then be output to the output unit 640 in accordance with a predetermined format, or displayed on the display/input unit 600 (step 795).

The automatic accounting processor and method therefor, according to the present invention, will be described in detail through an example transaction.

EXAMPLE 1

On Jan. 20, 1997, the electronics purchase part (code: B211) of the sales department of a company A Purchased 13 television sets (product code: 007, model code: CT-2599) from a company B (code A009) at a unit price so 650,000 Korean won and stored them in a warehouse (warehouse code: 9000). The companies A and B agreed to settlement terms in which 40% of the product cost would be settled by cash on the delivery date, and 60% would be settled by 90-day notes (maturity date: Apr. 20, 1997, bank: Korea Bank, code: K11).

When the transaction is created as above, the company A will perform an automatic accounting process and balancing operation using the accounting processor and method for an automated management control system according to the present invention. First, in the company A, to automatically account-process the created transaction without having special accounting knowledge, the standardized, formulated and compounded menu screen is displayed on the display/input unit 600 by the operation of the first processing portion 652. As the menu screen displayed on the display/input unit 600, the transaction form display 654, the transaction pattern display 656, the detailed pattern display 658, the fist standard management information display 660, the balancing operation target determiner 662, the transaction terms display 664, and the second standard management information display 666 are sequentially displayed. In this transaction, since products are purchased, and payment is made by both cash and notes, the payment item (code: 01) is selected from the receipt and payment items displayed on the transaction form menu screen, as demonstrated in Table 1. As to the transaction pattern, the transaction is a product purchase. Thus, if the purchase item (code: 011) concerned with the payment as the transaction pattern is selected, the detailed items concerned with the purchase are displayed on the menu screen, as demonstrated in Table 2, and then the product purchase (code: 0111) is selected among the items displayed on the menu screen.

The standard management information of the detailed transaction pattern concerned with the purchase is displayed on the menu screen, as demonstrated in Table 3. As the standard management information of the detailed transaction pattern concerned with the purchase, department codes, customer codes, product codes, model codes, units, quantity, unit price and currency codes, etc. are displayed on the menu screen through the display/input unit 600. Then, with B211 as the purchase department code, A009 (the company B) as the customer code, 007 (television) as the product code, CT-2599 as the model code, EA (pieces) as the unit code, 10 as the quantity code, 650,000 as the unit price code, ₩ (Korean won) as the currency code, and 9000 as the warehouse code, being selected and input using a keyboard or mouse, the transaction terms menu screen is displayed. Since the transaction of this example is a data to be balance-deducted data, the balancing operation target determiner 662 does not determine the transaction data as the balancing operation target data. Thus, the balance item searching part 688 does not operate.

Since the transaction terms are prescribed between the companies A and B, the prescribed terms are read in real time, ₩2,600,000 in cash, 40% of the settlement amount, and ₩3,900,000 in notes, 60% of the settlement amount, are displayed on the menu screen. Then, as the standard management information of the cash item, the item of the customer A009 (the customer code of the company B) is automatically generated. As the standard management information of the note item, the customer, note maturity date, kinds of notes, note number, bank items are displayed through the display/input unit 600. Then, A009 (the company B) as the customer, 1997.04.20 as the maturity date, FOB (promissory note) as the kind of note, 123456 as the note number, and K11 (Korea Bank) as the bank, are selected and input through a keyboard and mouse.

The selected and input data is classified and stored in the corresponding databases of the integrated management control data base 612, by the command of the second processing portion 668, for integrated management control. In more detail, the data necessary for purchase management, that is, B211 as the purchase department code, A009 (the company E) as the customer code, 007 (television) as the product code, CT-2599 as the model code, EA (pieces) as the unit code, 10 as the quantity code, 650,000 as the unit price code, ₩ Korean won) as the currency code, 9000 as the warehouse code, and 011 (purchase) as the detailed transaction pattern code, is stored in the purchase management database. The data necessary for distribution management, that is, 1997.01.20 as the warehousing date code, A009 as the customer code, 007 as the product code, CT-2599 as the model code, EA as the unit code, 10 as the quantity code, 9000 as the warehouse code, is stored in the distribution management database. The data necessary for fund management, that is, 1997.01.20 as the code of payment and note issue date code, A009 as the customer code, 2,600,000 as the cash code, 3,900,000 as the issued note code, FOS as the issued note type code, 1997.04.20 as the note maturity date code, 123456 as the note serial number code, K11 as the bank code, 01 (payment) as the selected transaction form code, and 0111 (purchase) as the detailed transaction pattern code, is stored in the fund management database. Here, the transaction date, warehousing date, payment and note issue date are automatically generated as the date the transaction was created (1997.01.20) because the transaction data is input the very date the transaction was created.

The third processing portion 670 selectively extracts data necessary for the accounting process for financial management among the data stored in the databases for the respective departments, that is, the purchase management database, the distribution management database, and the fund management database of the integrated management control database 612. The extracted data including 01 (payment) as the transaction form code, 0111 (purchase of products) as the transaction pattern code, 1997.01.20 as the transaction date, B211 as the purchase department code, A009 as the customer code, CT-2599 as the model code, 10 as the quantity code, ₩ (Korean won) as the currency code, 2,600,000 as the cash code, 3,900,000 as the issued note code, F05 as the issued note type code, 1997.04.20 as the note maturity date code, 123456 as the note serial number code, K11 as the bank code, is stored in the integrated accounting data base 654.

The transaction classifying portion 672 reads the transaction data stored in the integrated accounting database and generates the account information and debit/credit position information corresponding to the read transaction data by the transaction form, transaction pattern, transaction terms and predetermined standard management information having the transaction amount, which are already programmed, as demonstrated in Tables 1, 2, 3 and 4. In other words, since the transaction form for the products purchased by the company A is payment and the transaction pattern therefor is purchase of merchandise, the programmed transaction form and pattern automatically generated and determined as the debit side, and the transaction terms are generated and determined as the credit side. Accounts of merchandise and cash/note are automatically generated as the debit and credit sides, respectively. The generated account information, debit/credit information and predetermined standard management information having the transaction amount are temporarily stored in the first classification temporary storage portion 622.

The classifying and summing part 680 of the journal processing portion 678 reads the accounts information, debit/credit information and predetermined standard management information having the transaction amount, stored in the first classification temporary storage portion 622, and classifies and automatically journalizes the merchandise item of ₩6,500,000 in the debit side, and the cash item of ₩2,600,000 and the note item of ₩3,930,000 in the credit side, by referring to the standard management information data for the cash item, that is, 1997.01.20 as the payment date code, B211 as the purchase department code, A009 as the customer code, and ₩ as the currency code, and the standard management information data for the issued note item, that is, 1997.01.20 as the issue date code, B211 as the purchase department code, F05 as the issued note type code, 1997.04.20 as the note maturity date code, 123456 as the note serial number code, K11 as the bank code, and the standard management information data for the merchandise item, that is, 1997.01.20 as the transaction date, CT-2599 as the model code, 10 as the quantity code, ₩ (Korean won) as the currency code. If the journalizing result of the classifying and summing part 680 agrees with balancing principles, the normal processor 682 displays "merchandise 6,500,000" at the debit side, and 2,600,000 cash and 3,900,000 notes note" at the credit side, on the screen of the display/input unit 600. The normal processor 682 stores the account information, debit/credit information and predetermined standard management information having the transaction amount, in the accounting ledger storage portion 626, extracts the data to be balancing-operated among the normally processed transaction data to then store the same in the second classification temporary storage portion 628. At this time, if the journalizing result does not agree with balancing principles, the error processor 684 displays an error message on the display/input unit 600, deletes and corrects the error items by the first processing portion 652. If the data to be balancing-operated is to be balance-summed, the data including the company B as the customer, 1997.04.20 as the note maturity date and Korea Bank as the bank, for the issued note amount of ₩3,900,300, is balance-summed and stored in the balance-by-account storage portion 630, by the balancing operation processing portion 686, thereby completing the accounting process by the accounting processor and method for an automated management control system using a keyboard, according to the present invention.

For reference, the payment may be made directly by the company A after the transaction data is normally processed. Otherwise, at the same time when the transaction data of the company A is normally processed, the payment amount is automatically drawn out from the bank account of the company A through a firm banking system agreed upon by companies A and B and the bank of company A, and then automatically deposit to the bank account of the company B on a real time basis.

Following the transaction of the above example 1, the company A made a settlement by its Korea Bank account for the note of ₩3,900,000 to be paid to the company B on Apr. 20, 1997 (the maturity date of the issued note). The accounting process and balancing operation of the company A are performed as follows. First, in the company A, to automatically account-process the created transaction without having special accounting knowledge, the standardized, formulated and compounded menu screen is displayed on the display/input unit 600 by the operation of -he first processing portion 652. The items sequentially displayed on the menu screen of the display/input unit 600 are as described it the above example 1. Since the transaction is payment due to maturity of the redemption date for the note issued by the company A to the company B, the payment item is selected as the transaction form displayed by the transaction form display 654, and the fund expenditure item is selected as the transaction pattern.

Then, the detailed items corresponding to the fund expenditure of the transaction pattern are displayed on the menu screen, as demonstrated in Table 2, and the item of redemption by maturity of the issued note is selected as the detailed transaction pattern.

As the standard management information of the selected detailed item of the transaction pattern, that is, the redemption by the maturity date of the issued note, a transaction date, a customer code, and predetermined standard management information having the transaction amount are displayed.

With A009 as the customer code of the company B and 123456 as the note serial number being input, the balancing operation target determiner 662 determines the transaction data as the data to be balance-deducted because the transaction is redemption by maturity of the issued note, and notifies the determined result to the balancing operation processing portion 686. Then, the balance item searching part 688 searches and reads from the balance-by-account storage portion 630 the balance details for the issued note to be paid to the company B, the balance data including 1997.01.20 as the issue date, 1997.04.20 as the note maturity date, promissory note as the issued note type, 123456 as the note serial number, Korea Bank as the bank, and ₩3,900,000 as the note amount, and displays the same on the menu screen of the display/input unit 600. If the bank deposit item is selected by the first standard management information display 664 and the read balance data is selected, the standard management information concerned with the bank deposit item is displayed by the second standard management information display 666. Also, predetermined standard management information including K11 (Korea Bank) as the bank, 6789 as the bank account number, ₩ (Korean Won) as the currency code, is selected. If only the parts of the balance data stored in the balance-by-account storage portion 630 are to be balance-deducted, the corresponding balance details displayed by the balance item searching part 688 are not selected as the transaction amount item of the transaction terms display 664 but the amount is input. If the input amount is larger than the displayed balance amount, the balance input controller 690 displays an error message on the display/input unit 600, deletes and corrects the error item (amount) by the first processing portion 652.

The selected and input data is stored in the integrated management control database 612 by the second processing portion 668 and stored in the integrated accounting database 614 by the third processing portion 670. The subsequent procedure is performed in the same manner as described through the above example 1, with the exception of the following. In other words, the balancing processing classifier 692 extracts the transaction data to be balancing-operated stored in the second classification temporary storage portion 628 and classifies the same into the data to be balance-deducted data or to be balance-summed data. In this transaction, the company A paid ₩3,900,000 by note to the company B on the maturity date (Apr. 20, 1997) of the promissory note. Thus, the transaction data is classified as a balance to be deducted. The balance details related to the transaction, that is, the balance data including the information of 1997.01.20 as the issue date, 1997.04.20 as the maturity date, promissory note as the note type, 123456 as the note serial number, Korea Bank as the bank, and ₩3,900,000 as the note amount, are balance-deducted and stored in the balance-by-account storage portion 630, thereby completing the accounting process and balancing operation by the accounting processor and method for an automated management control system using a keyboard, according to the present invention.

Figure 8:
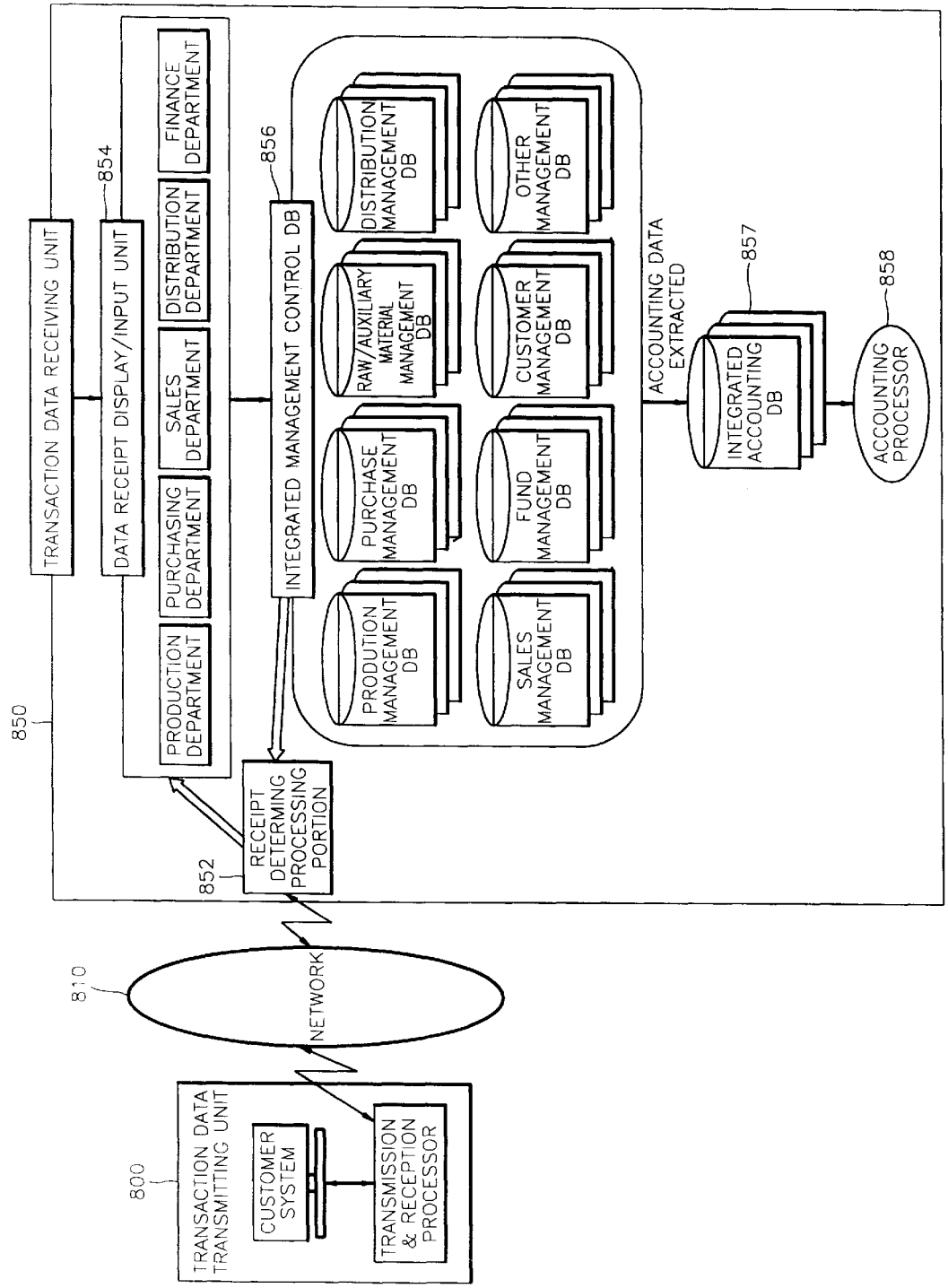
FIG. 8 is a block diagram showing the overall configuration of a system adopting the accounting processor using the network.

Next, the accounting processor using a network according to a preferred embodiment of the present invention will be described. FIG. 8 is a block diagram showing the overall configuration of a system adopting the accounting processor using the network, which includes a transaction data transmitting unit 800 for transmitting created transaction data, a transaction data receiving unit 850 for receiving the transmitted transaction data, a data communication network SIC for connecting the transaction data receiving unit 850 to at least one transaction data transmitting unit 800 and supplying transmission and reception channels of the transaction data. Here, the network 810 is connected with a customer system to transmit/receive the transaction data created by the business activities. Also, the network 810 is connected to various departments of the enterprise to allow the transaction data to be shared through the integrated management control database 856. Otherwise, the network 810 allows the transaction data stored in the integrated management control data base 856 and the integrated accounting database 857 and account-processed to be shared. Alternatively, it is possible to share the account-processed information by a transaction data storage portion for storing only the accounting-related transaction data for financial management, not by the integrated management control database 856 and the integrated accounting database 857.

In FIG. 8, the transaction data receiving unit 650 is similar to the accounting processor 530 shown in FIG. 5, with the exception of the transaction data transmitted from the transaction data transmitting unit 800 being received in the data receipt display/input unit 854 corresponding to the data input unit 500 through the receipt determining processing portion 852 using the network 810, unlike in FIG. 5 in which the transaction data is selected and input by the user directly through the data input unit 500. The integrated management control data base 856 and the integrated accounting database 857 are the same as those show in FIG. 5, reference numerals 510 and 520, respectively. The transaction data created by the business activities is stored in the integrated management control database 856, and the accounting-related transaction data for financial management is selectively extracted to then be stored in the integrated accounting database 857 for an accounting process. Otherwise, users of the respective departments selectively input the accounting-related transaction data among the transaction data created for the respective departments, and performs the accounting process by using the transaction data storage portion for storing only the accounting-related transaction data, instead of the integrated management control database 856 and the integrated accounting database 857.

Figure 9:
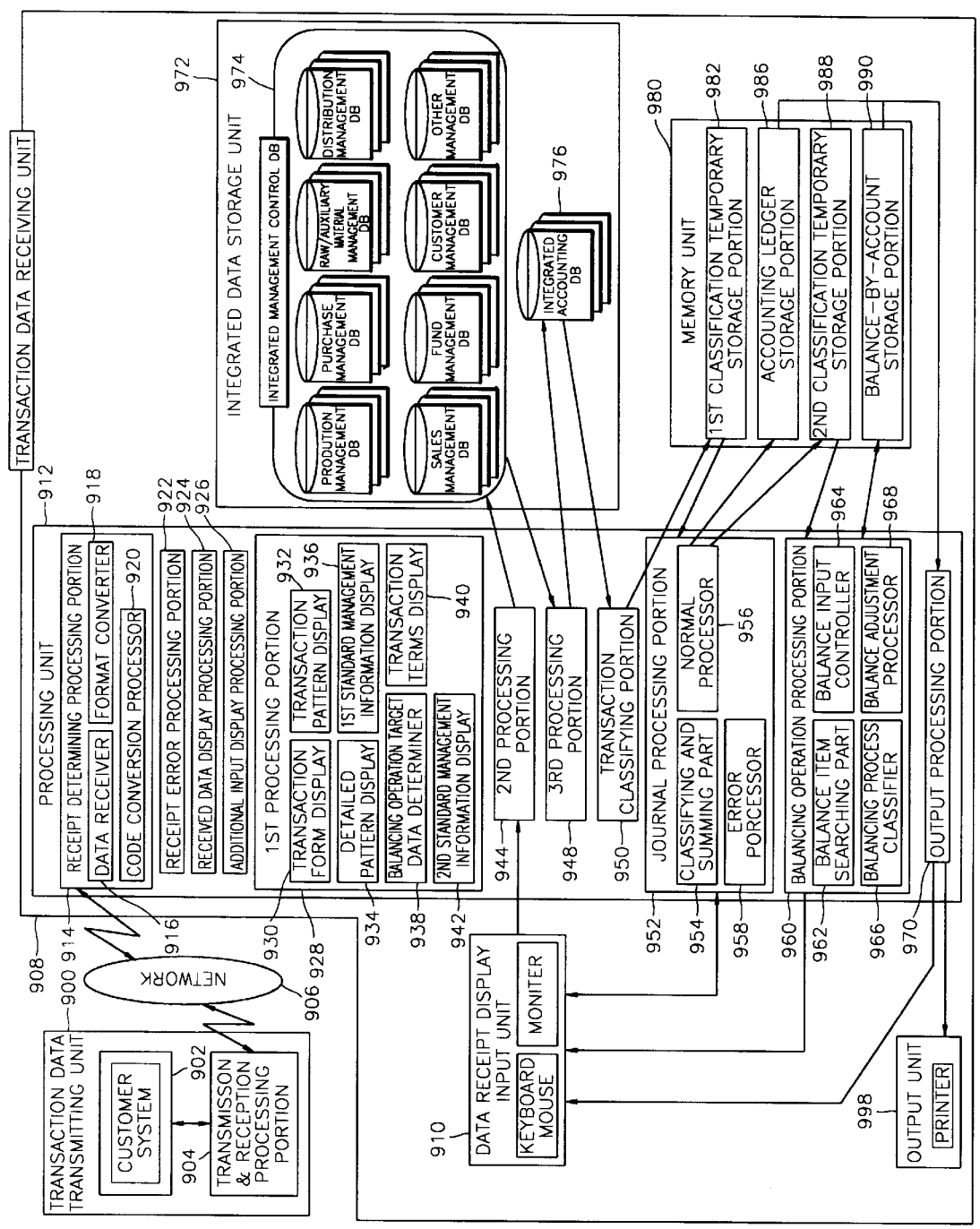
FIG. 9 is a more detailed version of the block diagram of FIG. 8.

FIG. 9 is a more detailed version of the block diagram of FIG. 8, including a transaction data transmitting unit 900, a data communication network 906, and a transaction data receiving unit 908, employing a system using a network and a keyboard in parallel.

The transaction data transmitting unit 900 corresponding to the transaction data transmitting unit 800 of FIG. 8 includes a customer system 902 and a transmission/reception processing portion 904.

The customer system 902 processes the created transaction data and employs not only the automatic accounting processor according to the present invention but also the conventional general-purpose computer system.

The transmission/reception processing portion 904 transmits compulsory reception items of the transaction data, prescribed with a receiving party through a transmission/reception packet of the network 906 in accordance with a predetermined format. The compulsory transmission and reception prescribed items can be transmitter or received by prescribing the entire or partial transaction data necessary for the management control system using the network.

The network 906 connects the transaction data receiving unit 908 with at least one transaction data transmitting unit 900 of the customer.

The transaction data receiving unit 908 corresponding to the transaction data receiving unit 850 of FIG. 8, includes a data receipt display/input unit 910, a processing unit 912, an integrated data storage unit 972, a memory unit 980, and an output unit 998.

The data receipt display/input unit 910 displays the transaction data received by the command of the processing unit 912.

The integrated data storage unit 972 includes an integrated management control database 974 and an integrated accounting database 976. The memory unit 980 includes a first classification temporary storage portion 982, an accounting ledger storage portion 986, a second classification temporary storage portion 988, and a balance-by-account storage portion 990. The integrated data storage unit 972 and the memory unit 980 correspond to the integrated data storage unit 610 and the memory unit 620 of FIG. 6. Thus an explanation thereof will be omitted.

The processing unit 912 displays the transaction data received from the transaction data transmitting unit 900 on the menu screen of the data receipt display/input unit 910 to be stored in the integrated data storage unit 972 by the user's verification and determination, and the transaction data is account-processed for financial management to be stored in the memory unit 980. The processing unit 912 includes a receipt determining processing portion 914, a receipt error processing portion 922, a received data display processing portion 924, an additional input display processing portion 926, a first processing portion 928, a second processing portion 944, a third processing portion 948, a transaction classifying portion 950, a journal processing portion 952, a balancing operation processing portion 960 and an output processing portion 970.

The receipt determining processing portion 914 receives the data transmitted from the transaction data transmitting unit 900 through the network 906 and checks and determines whether the data is capable of being received and processed. The receipt determining processing portion 914 includes a data receiver 916, a format converter 918, and a code conversion processor 920.

The data receiver 916 determines whether the data transmitted from the transaction data transmitting unit 900 includes a compulsory receipt item, notifying the determination result to the receipt error processing portion 922 if the data is determined to be not capable of being received, and receives the transmitted data if the data is determined to be capable of being received. The format converter 918 sequentially converts the data received from the data receiver 916 to be suitable for the format of the management control system. The code conversion processor 920 conversion-processes the received data so that the data converted by the format converter 918 corresponds to the standardized, formulated and compounded transaction form, transaction pattern, transaction terms and predetermined standard management information having transaction amount, and notifies the fact to the receipt error processing portion 922 that the data does not agree with the code conversion processing condition of the management control system if the data does not agree with the code conversion processing condition, and notifies the fact to the received data display portion 924 if it does agree.

The receipt error processing portion 922 deletes the received and receipt-processed transaction data if the transaction data is determined to be in capable of being received and being receipt-processed, the transaction data displayed on the data receipt display/input unit 924 is determined to be different than the actual transaction data by the user's verification, or the receipt-processed transaction data which is to be balancing-operated is compared with the corresponding balance details to be error-processed, and notifies the deletion to the transmission/reception processor 904 of the transaction data transmitting unit 900.

The received data display processing portion 924 receipt-processes the received transaction data if the data is determined to be capable of being received, sequentially processes the transaction data receipt-processed by the first processing portion 928 according to the processing conditions of the corresponding items of the transaction form, transaction pattern, transaction terms and predetermined standard management information concerned with the transaction form, transaction pattern and transaction terms. The balancing operation target determiner 938 of the first processing portion 928 determines whether the processed transaction data is to be balance-deducted, if the transaction data satisfies the processing conditions and there is no further item to be processed. If the data is determined to be balance-deducted, the balance item searching part 962 searches the balance data corresponding to the processed transaction data from the balance-by-account storage portion 990 to then compare the searched balance data with the processed transaction data. If the processed transaction data is larger than the searched balance data, the transaction data is error-processed by the balance input controller 964 to then notify the receipt error processing portion 922. If the processed transaction data is equal to or smaller than the searched balance data, the transaction data is normally processed to then be displayed on the data receipt display/input unit 910 for the user's verification. If the displayed transaction data is different from the actual transaction, the displayed transaction data is processed as an error by the user's selection to then notify the processed error to the receipt error processing portion 922. If the displayed data is not compulsory receipt data to then be processed as an error or the transaction data is error-processed by the journal processing portion 952, the data of the corresponding error item is deleted by the user's selection and the additional input display processing portion 926 is notified that the data for the deleted item is additionally input. If the data is suitable to the processing conditions of the management control system and it is determined that there is an item to be further input, the additional input display processing portion 926 is notified that the data for the item to be additionally input is to be additionally input.

The additional input display processing portion 926 sequentially displays items to be additionally input by the first processing portion 928 to be suitable to the processing conditions of the data receipt display/input unit 910, for the purpose of additionally selecting and inputting necessary data.

The first processing portion 928, like the first processing portion 652 of FIG. 6, includes a transaction form display 930, a transaction pattern display 932, a detailed pattern display 934, a first standard management information display 936, a balancing operation target data determiner 938, a transaction terms display 940, and a second standard management information display 942. While the first processing portion 652 of FIG. 6 operates by the user's sequential selection and input of transaction data according to a display sequence, the first processing portion 926 receives the transaction data including the transaction form, transaction pattern, transaction terms and predetermined standard management information having the transaction amount, through a data communication network, by the command of the received data display processing portion 924, and sequentially processes the same according to the processing conditions for the corresponding item. Otherwise, if there is an item to be additionally input, only the items to se additionally input are displayed on the data receipt display/input unit 910 by the additional input display processing portion 926.

The second processing portion 944 classifies the data received and additionally input through the data receipt display/input unit 910 to be stored in the databases for the respective departments constituting the integrated management control database 974, and the classified data for the respective departments is stored in the corresponding databases.

The third processing portion 948, the transaction classifying portion 950, the journal processing portion 952, the balancing operation processing portion 960, and the output processing portion 970 are the same as those of FIG. 6, and thus the explanation thereof will be omitted.

Figure 10:
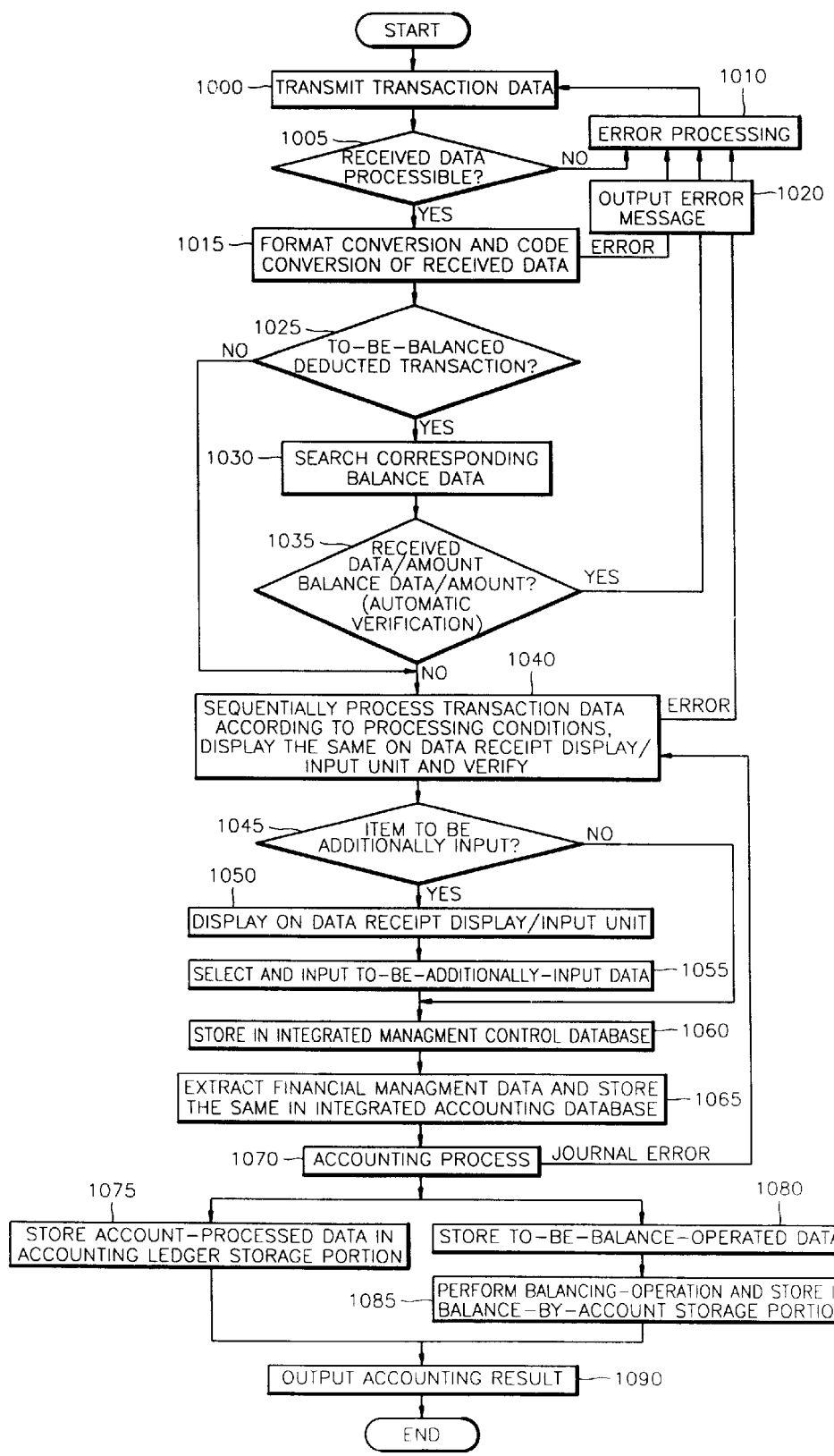
FIG. 10 is a flow diagram of the operation of an accounting processor using the network, according to a preferred embodiment of the present invention.

FIG. 10 is a flow diagram of the operation of an accounting processor using the network, according to a preferred embodiment of the present invention, the operation of which will now be described.

First, the transaction data of compulsory receipt items prescribed with a receiving party is transmitted through the network 908 by the transmission/reception processor 904 of the transaction data transmitting unit 900, in accordance with a predetermined format (step 1000). The transmitted data is checked to determine whether the data is able to be processed in the receipt determining processing portion 954 and whether the data is capable of being received (step 1005). If the data is determined to not be capable of being received in the receipt determining processing portion 914, the data is processed as an error (step 1010). If the data is determined to be capable of being received in the receipt determining processing portion 914, the received data is converted into the format of the management control system, and conversion-processed into the code suitable to the transaction form, transaction pattern, transaction terms and predetermined standard information having transaction amount (step 1015). If the data does not agree with the conversion-processing conditions of the management control system, an error message is output to then notify the fact to the receipt error processing portion 922 (step 1020). If the database agree, this is notified to the received data display processing portion 924 (step 1015). The received data is sequentially processed by the operation command of the received data display processing portion 924 and the first processing portion 928 according to the processing conditions of the corresponding items of the transaction form, transaction pattern, transaction terms and predetermined standard information concerned with the transaction form, transaction pattern and transaction terms. If the data is suitable to the processing conditions and it is determined that there is no item to be additionally input, it is determined by the balancing operation target determiner 938 whether the received data is to be balance-deducted (step 1025). If the data is determined to be balance-deducted, the data corresponding to the received transaction data is searched by the balance item searching part 962 of the balancing operation processing portion 960 (step 1030). The received transaction data and the searched data are automatically verified (step 1035). If the received transaction data including the transaction amount is larger than the balance data extracted by the balance item searching part 962, the procedure returns to the step 1020 to output an error message for processing an error to then notify the fact to the receipt error processing portion 922. If the received transaction data is equal to or smaller than the balance data, the received transaction data is normally processed and displayed on the data receipt display/input unit 910 for user verification (step 1040). If the displayed data is different from the actual transaction data, the procedure returns to the step 1020. if the displayed data is not compulsory receipt data to be processed as an error or the transaction data is error-processed by the journal processing portion 952, the data of the corresponding error item is deleted, and the deletion is notified to the additional input display processing portion 926. If the data is suitable to the processing conditions of the management control system and it is determined that there is an item to be further input (step 1045). If it is determined that there are items to be additionally input, the corresponding data is displayed on the data receipt display/input unit 910 (step 1050). The displayed data is sequentially selected and input (step 1055). The data is stored in the databases for the respective departments of the integrated management control database 974 (step 1060). Then, the accounting-related transaction data for financial management is selectively extracted from the databases for the respective departments of the integrated management control database 974 and stored in the integrated accounting database 976 (step 1065).

The data stored in the integrated accounting database 976 is read and accounting-processed (step 1070), and the accounting-processed data is stored in the accounting ledger storage portion 986 (step 1075). The processed data to be balancing-operation is read among the accounting-processed transaction data to then be stored (step 1080), and the data is balancing-operation processed and stored in the balance-by-account storage portion 990 (step 1085). Then, the accounting-process result is output (step 1090). These sequential steps are the same as those of FIG. 7 and thus the detailed explanation thereof will be omitted.

The automatic accounting processor and method therefor, using a data communication network, according to the present invention, will be described through a detailed explanation of an example transaction.

EXAMPLE 2

It is assumed that the company A uses a system adopting the accounting processor and method for an automated management control system, and is connected with the company B through a network. It has been agreed that the company B would transmit the transaction data created by the transaction with the company A in accordance with a Predetermined data format through the network. Also, it has been agreed that the company B would transmit to the company A all data necessary for the management control of the company A.

On Jan. 20, 1997, the electronics purchase part (code: B211) of the sales department of the company A purchased 10 television sets (product code: 007, model code: CT-2599) from the company B (code A009) at a unit price of 650,000 Korean won and put them into a warehouse (warehouse code: 9000). The companies A and B agreed upon settlement terms in which 40% of the product cost would be settled by cash on the delivery date, and 60% would be settled by 90 days notes maturity date: Apr. 20, 1997, bank: Korea Bank, code: K11). Additionally, it was agreed that a cash payment would be made from the company A's bank account (K6789) in the bank (K11) to the company B's bank account (7788) in the bank (S22) through a firm banking system.

When the above-described transaction occurs, the transaction from the perspective of the company A is purchase, and from the perspective of the company B is sales. The company B transmits the transaction data to the company A, as prescribed between both parties. The company A receives the transaction data to perform an accounting process and balancing operation for management control and financial management. The company B transmits the transaction data by its transaction data transmitting unit 900, and the company B receives the transaction data through the network 906. On the presumption that the received transaction data is normally processed and account-processed without inputting further transaction data, the company A performs the accounting process and balancing operation as follows.

The transmission/reception processing portion 904 of the transaction data transmitting unit 900 of the company B transmits to the company A the transaction data made into a packet in accordance with the prescribed terms of data transmission and reception to be received and processed in the company A through the network 906.

The transmitted data is determined by the receipt determining processing portion 914 whether it is capable of being received or not. The transaction data is received through format conversion and code conversion. When the company B uses the system adopting the accounting processor and method for an automated management control system according to the present invention, the format conversion and code conversion may not be performed.

The procedure of the format conversion and code conversion of the received data will now be described in detail. The company B fixes the transaction data concerned with sales in its own system and makes it into a packet in accordance with the data format of the company A, to then transmit to the company A all the transaction data necessary for the management control system of the company A. Then, the company A receives the transaction data and performs the data format conversion and code conversion suitable for the management control system of the company A, which will now be described in more detail. In this example, it is assumed that the transaction data transmitted form the company B and the format thereof are as follows: 970120 as the transaction date (A), 1000 (the company A), as the customer code (B), C001 as the product code (C), TV123 as the model code (D), EA as the unit code (E), 10 as the quantity code (F), M01 (the company A's warehouse) as the warehouse code (G), 650000 as the unit price (H), W as the currency code (I) and A01 as the sales pattern (J). The format converter 918 of the management control system of the company A sequentially arranges the received data and converts the same to be suitable for the format of the management control system of the company A.

The conversion sequence in the management control system of the company A is from the transaction date (A) to the customer code (B) to the product code (c) to the model code (D) to the unit code (E) to the quantity code (F) to the warehouse code (G). At this time, the data converted by the format converter 918, that is, the transaction form, transaction pattern, transaction terms and predetermined standard management information having transaction amount, which are standardized, formulated and compounded by the management control system of the company A, is converted into codes corresponding to the code standards of the company A, by the code conversion processor 920. Tn more detail, 970120 as the transaction date code of the company B is converted into 1997.01.20 as that of the company A, A01 A (sales) as the transaction pattern of the company B is converted into 01 (payment) as the transaction form, 011 (purchase) as the transaction pattern and 0111 (purchase of products) as the detailed transaction pattern, of the company A, 1000 (the company A) as the customer code of the company B is converted into A009 (the company B as that of the company A, C001 as the product code of the company B is converted into CTV as that of the company A, TV123 as the model code of the company B is converted into CT-2599 as that of the company A, EA as the unit code of the company B is converted into EA as that of the company A, 10 as the quantity code of the company B is converted into 10 as that of the company A, ₩ as the currency code of the company B is converted into ₩ as that of the company A, 650000 as the unit price code of the company B is converted into ₩650,000 as that of the company A, and M01 (the company A's warehouse in the company B's system) as the warehouse code of the company B is converted into 9000 as that of the company A, respectively, and automatically generated and determined to be B211 as the purchase department code, which allows the department to be recognized by the employee's number of the system user. The code conversion processor 920 performs a code conversion based on the prescribed conditions for the received data between customers.

The received data display processing portion 924 receives and processes the transaction data if the data is determined to be capable of being received. The received data is sequentially processed to correspond to the items of the transaction form, transaction pattern, transaction terms and predetermined standard management information having transaction amount by the received data display processing portion 924 and the first processing portion 928. The transaction terms display 940 reads the details prescribed with the company B on a real time basis so that the data of ₩2,600,000 (the bank deposit), and ₩3,900,000 (the note) is automatically generated and determined. In the second standard management information display 942, the standard management information of the cash item, including A009 (the company B's customer) as the customer code, K11 (Korea Bank) as the company A's paying bank, K6789 as the Korea Bank account of the company A, S22 (Seoul Bank, as the company B's receiving bank, and S7788 as the Seoul Bank account of the company B, and the standard management information of the note item, including A009 as the customer, 1997.04.20 as the note maturity date, 123456 (the next number of already issued number of 123455) as the note serial number, and K11 as the bank, are automatically generated and determined. Then, the balancing operation target data determiner 938 determines whether the transaction data is to be balancing-operated. Since the received transaction data is to-be-balance-summed data, the balancing operation target data determiner 938 does not determine that the received transaction data is data to he balance-summed data, so that the balance item searching part 962 does not operate.

Since the transaction data is determined to be suitable for the processing conditions of the management control system and to have no item to be further processed, the data is displayed on the data receipt display/input unit 910 for verification and changes so that the displayed transaction data is the same as the actual transaction data. If it is determined that there is no further item to be processed because only the compulsory receipt items are received, the items to be further input are displayed on the data receipt display/input unit 910 by the additional input display processing portion 926 and the first processing portion 928, so that the data corresponding to the items to be further input is selected and input. Here, as the payment conditions, the payment terms have been additionally prescribed between the companies A and B that the payment in cash would be made from the company A's Korea Bank (K11) account No. K6789 to the company B's Seoul Bank (S22) account No. S7788 through a firm banking system. Thus, the bank deposit item as the transaction terms is automatically generated and determined. The standard management information concerned with the transaction terms allows the transaction data to be automatically generated and determined, as described above.

The selected and input data is stored in the integrated management control database 974 through the second processing portion 944. Hereinafter, the same procedure as described in FIG. 6 and Example 1 is performed, thereby completing the automated accounting process using the accounting processor and method using a network according to the present invention.

In the configuration shown in FIG. 9, the transaction data may be received through the network 906 or input through the data receipt display/input unit 910 using a keyboard, and both may be used in parallel, which is called a compatible accounting processor using a keyboard input portion. In more detail, the compatible accounting processor adopts the accounting processor and method using a network, shown in FIG. 9, and using a keyboard for selecting and inputting transaction data, shown in FIG. 6.

As shown in FIG. 9, in the case of the accounting processor adopting the network and keyboard in parallel, the functions of the elements are changed as follows.

First, the transaction data transmitting unit 900, the customer system 902, the transmission/reception processing portion 904, the network 908, the receipt error processing portion 922, the received data display processing portion 924, the additional input display processing portion 96 are used in the system using a network but not in the system using a keyboard. As described above in FIG. 6, if transaction data is created, the created data is displayed on the data receipt display/input unit 910 by the command of the first processing portion 928. If the transaction data is selected and input through the data receipt display/input unit 910, an accounting process and a balancing operation are performed.

However, the second processing portion 942 allows the management control data to be stored in the databases for the respective departments of the integrated management control database 974 for integrated management of the data, if the management control data is input through the network or the data receipt display/input unit 910 using the keyboard, from whichever the data is input.

The explanation of other elements will be omitted as they are the same as the corresponding parts described above referring to FIGS. 6 and 9 and Examples 1 and 2.

According to the present invention, created transaction data can be managed and accounting-processed on a real time basis, using a network or a keyboard, based on the management control business and accounting principles of an enterprise. Otherwise, the transaction data can be managed and accounting-processed using the network and keyboard in parallel.

According to the present invention, by standardizing, formulating and compounding business activities for the respective departments of an enterprise, an integrated management control database is constructed for integrally unifying the transaction data for the respective departments, so that the management control information is produced by the accounting processor and method according to the present invention, and shared by the respective departments. Also, an integrated accounting database is constructed for extracting the accounting-related transaction data from the integrated management control database for financial management to then be accounting-processed, so that the transaction data is accounting-processed according to the present invention and the processed financial information is produced and shared by the respective departments. Further, upon the request of the enterprise, without construction of the integrated management control database, the transaction data can be accounting processed according to the present invention and the processed financial information can be produced and shared by the respective departments of the enterprise.

According to the present invention, a user has only to simply manipulate the management control system by the processing sequence supplied from a menu screen of the system, so that errors due to the user's mistake can be automatically controlled, which allows data processing to be performed accurately on a real time basis. Also, a balancing operation can be achieved accurately on a real time basis by automatically controlling errors.

By using the accounting processor and method according to the present invention, an accounting process for management control can be easily performed by a user having little or no special accounting knowledge and skill. Also, the accounting ledgers can be simply processed on a real time basis. Further, the processing time for the transaction data for management control can be remarkably reduced, thereby implementing a time-controlled management, which is essential to management.

Therefore, according to the present invention, effective manpower, improved productivity, management information production and sharing, an integrated management control system, and speedy management control can be realized.

What is claimed is:

1. An apparatus for executing an accounting process on transaction data including transaction information, transaction terms information and standard management information comprised of predetermined management items, comprising:

a display/input unit, a storage device and a processing unit, wherein said display/input unit displays an input screen of predetermined transaction data and a balance details screen for a balance operation, and enables selection of a predetermined menu supplied from the screen or inputs the transaction data;

wherein said storage device comprises:

a transaction data storage portion for storing the transaction data selected and input from said display/input unit;

an accounting ledger storage portion for storing account information account-processed for financial management, debit/credit information and predetermined standard management information comprised of at least a transaction amount; and a balance-by-account storage portion for storing accounts corresponding to results of the balancing operation and predetermined standard information comprised of at least the transaction amount; and wherein said processing unit comprises:

a first processing portion for displaying a transaction data input screen on said display/input unit, checking whether the input transaction data are to be balance-deducted and storing the input transaction data into said transaction data storage portion;

a transaction classifying portion for generating corresponding account information and debit/credit position information from the transaction information, transaction terms information and the standard management information related thereto, stored in said transaction data storage portion;

a journal processing portion for classifying and summing the account information, the debit/credit position information and the predetermined standard management information comprised of the transaction amount into a debit side and a credit side, storing the same in said accounting ledger storage portion, and determining whether the transaction data is to be balancing-operated; and a balancing operation processing portion for displaying balance details of the relevant customer for the accounts corresponding to the transaction data if the transaction data are determined to be balance-deducted in said first processing portion, classifying the data to be balancing-operated into data to be balance-summed and data to be balance-deducted, summing the data to be balance-summed to the balance details of the relevant customer for the corresponding account, deducting the data to be balance-deducted from the balance details, and storing the result in said balance-by-account storage portion.

2. The apparatus according to claim 1, wherein, when the transaction data includes transaction for, information, and standard management information corresponding to the transaction form, transaction pattern and transaction terms and comprised of predetermined management items for detailed management, and the transaction data corresponds to a predetermined data format, and wherein said storage device further comprises:

a first classification temporary storage portion for temporarily storing account information, debit/credit information and predetermined standard management information comprised of at least the transaction amount; and a second classification temporary storage portion for extracting data to be balancing-operated among the transaction data and temporarily storing the same, said processing unit comprises:

a first processing portion for displaying a transaction data input screen on the display/input unit, checking whether the transaction data is to be balance-deducted, if the transaction data is selected and input through said display/input unit;

a storage processing portion for storing the transaction data in said transaction data storage portion;

a transaction classifying portion For reading a transaction form, a transaction pattern, transaction terms and standard management information concerned with the transaction form, transaction pattern and transaction terms, generating the corresponding account and debit/credit position information from the read data, and storing the generated accounts, debit/credit information and predetermined standard management information comprised of the transaction amount in said first classification temporary storage portion;

a journal processing portion for classifying and summing the account information, debit/credit position information and the predetermined standard management information comprised of the transaction amount into a debit side and a credit side, storing the same in said accounting ledger storage portion, determining whether the data is to be balancing-operated, and storing the corresponding account information, debit/credit information and the predetermined standard management information comprised of the transaction amount in said second classification temporary storage portion; and a balancing operation processing portion for reading balance details of the relevant customer for the accounts corresponding to the transaction data selected and input from said balance-by-account storage portion if the transaction data is determined to be balance-deducted in said first processing portion, displaying the same on said display/input unit, classifying the data to be balancing-operated into data to be balance-summed and data to be balance-deducted to then sum or deduct the balance-summed/deducted data to/from the balance details of the relevant customer for the corresponding account, and storing the result in said balance-by-account storage portion.

3. The apparatus according to claim 1, further comprising:

an output unit connected to said processing unit for outputting financial information including financial statements having a predetermined format, wherein said processing unit further comprises:

an output processing portion for reading the data stored in said accounting ledger storage portion and said balance-by-account storage portion by a user's request, outputting the read data to said output unit to be suitable for a predetermined format, and displaying the same on said display/input unit.

4. The apparatus according to claim 2, further comprising:

an output unit connected to said processing unit for outputting financial information including financial statements having a predetermined format, wherein said processing unit further comprises:

an output processing portion for reading the data stored in said accounting ledger storage portion and said balance-by-account storage portion by a user's request, outputting the read data to said output unit to be suitable for a predetermined format, and displaying the same on said display/input unit.

5. The apparatus according to claim 2, wherein, when data for management control is standardized, formulated and compounded into a predetermined data format, and the transaction data corresponds to the standardized, formulated and compounded data format, said display/input unit receives the transaction data according to the data format, said transaction data storage portion of said storage device comprises:

an integrated management control database for storing the transaction data selected and input through said display/input unit and having databases by management control departments divided according to predetermined management control items; and an integrated accounting database for storing data necessary for accounting process for financial control, among the data stored in the integrated management control database, wherein said storage processing portion comprises:

a second processing portion for classifying the transaction data selected and input through said display/input unit to be stored in the databases for the respective departments of the integrated management control database and storing the classified data for the respective departments in the corresponding databases; and a third processing portion for selectively extracting the transaction data to be account-processed for financial control from the databases for the respective departments of said integrated management control database and storing the extracted data in said integrated accounting database, and wherein said transaction classifying portion reads data from said integrated accounting database.

6. The apparatus according to claim 2, wherein said first processing portion comprises:

a transaction form display portion for displaying payment and receipt items corresponding to the transaction form on a menu screen of said display/input unit;

a transaction pattern display portion for displaying purchasing, warehousing, fund expenditure, financial transfer payment items corresponding to transaction patterns on said display/input unit, if the payment item is selected from said transaction form display portion as the transaction form, and displaying sales, delivery, fund revenue, financial transfer receipt items corresponding to transaction patterns or said display/input unit, if the receipt item is selected by said transaction form display portion as the transaction form;

a detailed pattern display portion for displaying a predetermined detailed item corresponding to the selected transaction pattern and decided according to accounting principles on said display/input unit, if the transaction pattern is selected by said transaction pattern display portion;

a first standard management information display portion for displaying at least one or more standard management items corresponding to the detailed item on said display/input unit to then be selected and input, if the detailed item concerned with the transaction pattern is selected by said detailed pattern display portion;

a balancing operation target data determining portion for determining whether the transaction to be balancing-operated is to be balance-deducted, according to the transaction form, transaction pattern, detailed pattern and standard management information, respectively selected and input from said transaction form display portion, transaction pattern display portion, said detailed pattern display portion and said first standard management information display portion;

a transaction terms display portion for selecting transaction terms corresponding to cash, a bank deposit, a note, a credit and an adjustment and displaying a transaction terms menu screen for inputting the transaction amount corresponding to the selected transaction terms item on said display/input units if the transaction to be balancing-operated is determined by the balancing operation target determining portion to not be balance-deducted, and if the to-be-balancing-operated transaction is determined to be balance-deducted, notifying that the target data is to be balancing-operated, reading the balance details of the relevant customer for the corresponding account from said balance-by-account storage portion to then be displayed in said display/input unit, and displaying the transaction terms menu screen on said display/input unit; and a second standard management information display portion for displaying at least one or more standard management items corresponding to the transaction terms if the transaction terms item is selected and input from said transaction terms display portion.

7. The apparatus according to claim 5, wherein said first processing portion comprises:

a transaction form display portion for displaying payment and receipt items corresponding to the transaction form on a menu screen of said display/input unit;

a transaction pattern display portion for displaying purchasing, warehousing, fund expenditure, financial transfer payment items corresponding to transaction patterns on said display/input unit, if the payment item is selected from said transaction form display portion as the transaction form, and displaying sales, delivery, fund revenue, financial transfer receipt items corresponding to transaction patterns on said display/input unit, if the receipt item is selected by said transaction form display portion as the transaction form;

a detailed pattern display portion for displaying a predetermined detailed item corresponding to the selected transaction pattern and decided according to accounting principles on said display/input unit, if the transaction pattern is selected by said transaction pattern display portion;

a first standard management information display portion for displaying at least one or more standard management items corresponding to the detailed item on said display/input unit to then be selected and input, if the detailed item concerned with the transaction pattern is selected by said detailed pattern display portion;

a balancing operation target data determining portion for determining whether the transaction to be balancing-operated is to be balance-deducted, according to the transaction form, transaction pattern, detailed pattern and standard management information, respectively selected and input from said transaction form display portion, transaction pattern display portion, said detailed pattern display portion and said first standard management information display portion;

a transaction terms display portion for selecting transaction terms corresponding to cash, a bank deposit, a note, a credit and an adjustment and displaying a transaction terms menu screen for inputting the transaction amount corresponding to the selected transaction terms item on said display/input units if the transaction to be balancing-operated is determined by the balancing operation target determining portion to not be balance-deducted, and if the to-be-balancing-operated transaction is determined to be balance-deducted, notifying that the target data is to be balancing-operated, reading the balance details of the relevant customer for the corresponding account from said balance-by-account storage portion to then be displayed in said display/input unit, and displaying the transaction terms menu screen on said display/input unit; and a second standard management information display portion for displaying at least one or more standard management items corresponding to the transaction terms if the transaction terms item is selected and input from said transaction terms display portion.

8. The apparatus according to claim 2, wherein said journal processing portion comprises:

a classifying and summing portion for classifying predetermined standard management information, comprised of the accounts information, debit/credit position information and transaction amount stored in said first classification temporary storage portion, into a debit side and a credit side and summing the classified transaction data for each of said debit/credit side;

a normal processing portion for displaying the journalizing result of said classifying and summing portion on said display/input unit if the sum of the debit/credit side transaction amount agrees with balancing principles, storing the transaction data in said accounting ledger storage portion, determining transaction data to be balancing-operated, and storing the determined data in said second classification temporary storage portion; and an error processing portion for displaying an error message on said display/input unit if the sum of the debit/credit side transaction amount does not agree with balancing principles, and deleting the corresponding error data input from said display/input unit or correcting the corresponding error item.

9. The apparatus according to claim 5, wherein said journal processing portion comprises:

a classifying and summing portion for classifying predetermined standard management information, comprised of the accounts information, debit/credit position information and transaction amount stored in said first classification temporary storage portion, into a debit side and a credit side and summing the classifies transaction data for each of said debit/credit side;

a normal processing portion for displaying the journalizing result of said classifying and summing portion on said display/input unit if the sum of the debit/credit side transaction amount agrees -with balancing principles, storing the transaction data in said accounting ledger storage portion, determining transaction data to be balancing-operated, and storing the determined data in said second classification temporary storage portion; and an error processing portion for displaying an error message on said display/input unit if the sum of the debit/credit side transaction amount does not agree with balancing principles, and deleting the corresponding error data input from said display/input unit or correcting the corresponding error item.

10. The apparatus according to claim 2, wherein said balancing operation processing portion further comprises:

a balance input controller for processing as an error the transaction data for the transaction amount if the transaction amount is larger than the corresponding balance amount of the relevant customer for the corresponding account displayed on said display/input unit by said balancing operation processing portion.

11. The apparatus according to claim 5, wherein said balancing operation processing portion further comprises:

a balance input controller for processing as an error the transaction data for the transaction amount if the transaction amount is larger than the corresponding balance amount of the relevant customer for the corresponding account displayed on said display/input unit by said balancing operation processing portion.

12. A balancing operation processing apparatus for balancing-operating transaction data created between customers and account-processing the same, comprising:

a display/input unit, a storage device and a processing unit;

wherein said display/input unit displays an input screen for processing transaction data, and selects at least one menu supplied from the input screen or receives the transaction data;

wherein said storage device comprises:

a balance-by-account storage portion for storing predetermined standard information comprised of accounts corresponding to results of the balancing operation and transaction amount; and wherein said processing unit comprises:

a balancing operation target data determining portion for determining whether the transaction data selected and input by said display/input unit are to be balance-summed or balance-deducted;

a balance details searching portion for reading the balance details of the relevant customer for the account corresponding to the predetermined standard management information comprised of the transaction form, transaction pattern and transaction amount selected and input from said balance-by-account storage portion if the transaction data are determined to be balance-deducted in said balancing operation target data determining portion, and displaying the read balance details on said display/input unit;

a transaction terms display portion for displaying the standard management information comprised of transaction terms if the balance details are displayed on said display/input unit, and inputting the transaction terms and the related standard management information;

a balancing process classifying portion for classifying the transaction data into data to be balance-summed and data to be balance-deducted if the transaction terms and the related standard management information are input; and a balance adjustment processing portion for reading the corresponding account of said balance-by-account storage portion and the balance details of the relevant customer and deducting the transaction amount from the balance if the transaction data are determined to be balance-deducted, and for reading the corresponding account of said balance-by-account storage portion and the balance details of the relevant customer and summing the transaction amount to the balance if the transaction data are determined to be balance-summed.

13. The balancing operation processing apparatus according to claim 12, further comprising:

a balance input controller for processing as an error the transaction data for the transaction amount if the transaction amount is larger than the corresponding balance amount of the relevant customer for the corresponding account displayed on said display/input unit by said balancing operation processing portion.

14. An accounting processing method using an accounting processing apparatus comprising: a display/input unit for displaying an input screen of predetermined transaction data and inputting the transaction data; a transaction data storage portion for storing the input transaction data; an accounting ledger storage portion for storing account information, debit/credit information and predetermined standard management information comprised of a transaction amount; and a balance-by-account storage portion for storing balancing-operated accounts and predetermined standard management information comprised of at least the transaction amount, when the transaction data include transaction information, transaction terms information and predetermined standard management information comprised of predetermined management items, said method comprising the steps of:

displaying the transaction data input screen on said display/input unit;

determining whether transaction data are to be balance-deducted if the transaction data are input, and displaying the balance details of the relevant customer for the account stored in said balance-by-account storage portion if the input transaction data are determined to be balance-deducted;

inputting the relevant standard management information comprised of the transaction terms and the transaction amount if the balance details are displayed, normally processing the transaction amount if the input transaction amount is less than or equal to the balance amount of the corresponding balance details, and error-processing the same if the input transaction amount is larger than the balance amount of the corresponding balance details;

storing the input transaction data in said transaction data storage portion;

classifying the transaction by generating account information corresponding to the transaction information, transaction terms information and the related standard management information, and debit/credit position information;

journalizing by classifying the predetermined standard management information including the generated account information, debit/credit position information and transaction amount into a debit side and a credit side, summing the same, displaying the result on said display/input unit, storing the same in said accounting ledger storage portion if there is no error, and checking whether the transaction data are to be balancing-operated;

determining whether the transaction data are to be balance-summed or balance-deducted if the transaction data are determined to be balancing-operated; and summing the transaction data to be summed to the corresponding balance details of the customer for the account stored in said balance-by-account storage portion if the transaction data are determined to be balance-summed, and deducting the transaction data to be deducted from the corresponding balance details of the customer for the account stored in said balance-by-account storage portion if the transaction data are determined to be balance-deducted, and storing the result in said balance-by-account storage portion.

15. The method according to claim 14, wherein, when the transaction data includes transaction form information comprised of items representing receipt and payment, transaction pattern information comprised of at least an item representing a purchase, detailed transaction pattern information comprised of at least an item representing purchase of the merchandise, transaction terms information comprised of at least predetermined transaction terms representing cash, and standard management information comprised of a predetermined management item for detailed management, corresponding to the transaction form, transaction pattern and transaction terms, said transaction classifying step comprises the steps of reading the transaction form, the transaction pattern, the transaction terms and the standard management information concerned with the transaction form, transaction pattern, and transaction terms, from said transaction data storage portion, generating an account information corresponding to the read data and debit/credit position information, and temporarily storing the generated accounts information, debit/credit information and predetermined standard management information including the transaction amount, wherein said journalizing step comprises the steps of classifying the predetermined standard management information including the stored account information, debit/credit position information and transaction amount into a debit side and a credit side, to sum the same, displaying the result on said display/input unit, to store the same in said accounting ledger storage portion if there is no error, and temporarily storing the transaction data to be balancing-operated, and wherein said determining step comprises the steps of reading the standard management information comprised of the temporarily stored account information, debit/credit position information and transaction amount, and determining whether the transaction data are to be balance-summed or balance-deducted.

16. The method according to claim 15, further comprising the step of:

reading the data stored in said account ledger storage portion and said balance-by-account storage portion by user's request, outputting the read data to be suitable to a predetermined format to said output unit, and displaying the same on said display/input unit.

17. The method according to claim 15, wherein, when said display/input unit standardizes, formulates and compounds the transaction data for management control into a predetermined data format, displays a predetermined input screen for inputting the transaction data, selects a menu item supplied from the input screen or inputting the transaction data, said transaction data storage portion comprises an integrated management control database for storing the transaction data selected and input through said display/input unit and having databases by management control departments divided according to predetermined management control items, and an integrated accounting database for storing data necessary for an accounting process for financial control, among the data stored in said integrated management control database, said storing step of the transaction data storage processing portion comprises the steps of:

classifying the transaction data selected and input through said display/input unit to be stored in the databases for the respective departments of said integrated management control database and storing the classified data for the respective departments in the corresponding databases;

selectively extracting the transaction data to be account-processed for financial control from the databases for the respective departments of said integrated management control database and storing the extracted data in said integrated accounting database; and reading a transaction form, a transaction pattern, transaction terms and standard management information concerned with the transaction form, transaction pattern and transaction terms, generating corresponding accounts and debit/credit position information from the read data, and storing predetermined standard management information comprised of the generated accounts, debit/credit information and transaction amount.

18. The method according to claim 15, wherein the journalizing step comprises the steps of:

classifying the generated predetermined standard management information comprised of the accounts information, debit/credit position information and transaction amount into a debit side and a credit side and summing the classified transaction data;

normally processing the transaction data by displaying the journalizing result on said display/input unit in the sum of the debit/credit side transaction amount does not agree with balancing principles, storing the transaction data in said accounting ledger storage portion, and temporarily storing the to-be-balancing-operated transaction data; and error-processing the transaction data by displaying an error message on said display/input unit if the sum of the debit/credit side transaction amount is not accordant to balancing principles, and deleting the corresponding error data input from said display/input unit or correcting the corresponding error item.

19. The method according to claim 17, wherein the journalizing step comprises the steps of:

classifying the generated predetermined standard management information comprised of the accounts information, debit/credit position information and transaction amount into a debit side and a credit side and summing the classified transaction data;

normally processing the transaction data by displaying the journalizing result on said display/input unit if the sum of the debit/credit side transaction amount does not agree with balancing principles, storing the transaction data in said accounting ledger storage portion, and temporarily storing the to-be-balancing-operated transaction data; and error-processing the transaction data by displaying an error message on said display/input unit if the sum of the debit/credit side transaction amount is not according to balancing principles, and deleting the corresponding error data input from said display/input unit or correcting the corresponding error item.

20. A balancing operation processing method using a balancing operation processing apparatus having a display/input unit for displaying an input screen for processing transaction data, and selecting at least one menu supplied from the input screen and inputting the transaction data, and a balance-by-account storage portion for storing predetermined standard information comprised of the balancing-operated accounts and transaction amount, said method comprising the steps of:

determining whether the transaction data selected and input by said display/input unit are to be balance-summed or balance-deducted;

reading the balance details of the relevant customer for the account from said balance-by-account storage portion if the transaction data are determined to be balance-deducted, and displaying the read balance details on said display/input unit;

inputting the transaction terms and the related standard management information if the balance details are displayed on said display/input unit;

normal-processing the balance details if the displayed balance amount is less than or equal to the transaction amount of the transaction data input through said display/input unit, and processing the balance details as an error if the input transaction amount is greater than the displayed balance amount;

determining whether the normally processed transaction data are to be balance-summed or balance-deducted; and account-processing the transaction data to be balance summed, summing the predetermined management information comprised of accounts and the transaction amount to the balance amount of the relevant customer for the corresponding account stored in said balance-by-account storage portion, and storing the result in the balance-by-account storage portion if the transaction data are determined to be balance-summed, and account-processing the transaction data to be balance-deducted, deducting the predetermined management information comprised of accounts and the transaction amount from the balance amount of the relevant customer for the corresponding account stored in said balance-by-account storage portion, and storing the result in said balance-by-account storage portion if the transaction data are determined to be balance-deducted.

21. An apparatus for executing an accounting process by receiving transaction data through a data communication network, comprising:

a transaction data transmitting unit for transmitting created transaction data;

a transaction data receiving unit for receiving the transmitted transaction data; and a network for connecting the transaction data receiving unit to at least one transaction data transmitting unit;

wherein said transaction data receiving unit includes a data receipt display/input unit, a storage unit, a processing unit and an output unit;

wherein, when the transaction data include transaction form information comprised of items representing receipt and payment, transaction pattern information comprised of items representing purchase and sales, transaction terms information comprised of predetermined transactions terms having at least cash, and standard management information comprised of predetermined management items for detailed management, corresponding to the transaction form, transaction pattern and transaction terms, and correspond to a predetermined data format, said data receipt display/input unit displays the received transaction data by the command of said processing unit; and wherein the storage unit comprises:

a transaction data storage portion for storing the transaction data;

a first classification temporary storage portion for temporarily storing account information, debit/credit position information and predetermined standard management information comprised of at least the transaction amount;

an accounting ledger storage portion for storing the account information, debit/credit information and predetermined standard management information comprised of at least the transaction amount, account-processed for financial management;

a second classification temporary storage portion for extracting the data to be balancing-operated among the transaction data and temporarily storing the same; and a balance-by-account storage portion for storing the accounts corresponding to results of the balancing operation and predetermined standard information comprised of at least the transaction amount; said processing unit comprises:

a receipt determining processing portion for determining whether the data transmitted from the transaction data transmitting unit through said network are capable of being received, and determining whether the data are converted into a code which can be interpreted and processed if the data are capable of being received;

a received data display processing portion for receipt-processing the received transaction data if the data are determined to be capable of being received, and generating a command to display the data through said data receipt display/input unit;

a first processing portion for sequentially processing the received transaction data according to processing conditions of the corresponding items of a transaction form, a transaction pattern, transaction terms and standard management information concerned with the transaction form, transaction pattern and transaction terms, determining whether the processed transaction data are to be balancing-operated, and displaying normally processed transaction data on said data receipt display/input unit if the transaction data to be balancing-operated are determined to be balance-deducted and then normally processed;

a receipt error processing portion for deleting the received and receipt-processed transaction data if the transaction data are determined to be incapable of being received and being receipt-processed, the transaction data displayed on said data receipt display/input unit are determined to be different from the actual transaction data by the user's verification, or the receipt-processed transaction data which are to be balancing-operated are compared with the corresponding balance details to be processed as an error, and notifying said transaction data transmitting unit of the deletion;

a data storage processing portion for storing the transaction data comprised of the transaction form, transaction pattern, transaction terms and standard management information concerned with the transaction form, transaction pattern and transaction terms in said transaction data storage portion, if the transaction data are normally processed;

a transaction classifying portion for reading the transaction data from said transaction data storage processing portion, generating account information and debit/credit position information corresponding to the read transaction data, and storing the generated account information, debit/credit position information and predetermined standard management information having at least the transaction amount in said first classification temporary storage portion;

a journal processing portion for classifying the account information, debit/credit position information and the predetermined standard management information having at least the transaction amount into a debit side and a credit side, and summing the same, normally processing the same if the sum of the debit/credit side transaction amount agrees with balancing principles, displaying the journalizing result on said data receipt display/input unit, storing the transaction data in said accounting ledger storage portion, displaying an error message on said data receipt display/input unit if the sum of the transaction amount does not agree with the balancing principles, determining transaction data to be balancing-operated among the normally processed transaction data and storing the corresponding account information, debit/credit position information and predetermined standard management information having the transaction amount;

a balancing operation processing portion for searching balance details on the relevant customer for the accounts corresponding to the transaction data if the transaction data are determined to be balance-deducted in said first processing portion, comparing the balance details with the data to be balance-deducted, error-processing and notifying said receipt error processing portion if the transaction amount of the transaction data to be balance-deducted is greater than that of the searched balance details, normally processing if the transaction amount of the transaction data to be balance deducted is less than or equal to that of the searched balance details, classifying the transaction data into data to be balance-summed and data to be balance-deducted, searching the balance details of the relevant customer for the corresponding account from said balance-by-account storage portion, adding the transaction data to be balance-summed to the searched balance details, deducting the to be balance-deducted transaction data from the searched balance details if the data are classified into the data to be balance-deducted, and storing the result in said balance-by-account storage portion; and an output processing portion for reading the data stored in said accounting ledger storage portion and said balance-by account storage portion by the user's request, outputting the read data according to a predetermined format to said output unit, and displaying the same on said data receipt display/input unit.

22. The apparatus according to claim 21, wherein, when the transaction data for management control are standardized, formulated and compounded into a predetermined data format be commonly used throughout all departments of an enterprise for business activities, and the transaction data include transaction form information comprised of items representing receipt and payment, transaction pattern information comprised of items representing purchase and sales, transaction terms information comprised of predetermined transactions terms having at least cash, and standard management information comprised of predetermined management items for detailed management, corresponding to the transaction form, transaction pattern and transaction terms, and corresponds to a predetermined data format, said transaction data storage portion of said data storage unit comprises an integrated management control database for storing the transaction data displayed on said data receipt display/input unit by the received data display processing portion and normally processed, and having databases by management control departments divided according to predetermined management control items, and an integrated accounting database for storing data necessary for an accounting process for financial control, among the data stored in said integrated management control database, wherein said storage processing portion comprises second processing portion for classifying the transaction data to be stored in said databases for the respective departments of said integrated management control database for integrated control of the transaction data if the management control data are normally processed, and storing the classified data for the respective departments in the corresponding databases, and a third processing portion for selectively extracting the transaction data to be account-processed for financial control from the databases for the respective departments of said integrated management control database and storing the same in said integrated accounting database, and wherein said transaction classifying portion reads data from said integrated accounting database.

23. The apparatus of claim 21, wherein said receipt determining processing portion comprises:

a data receiver for determining whether the data transmitted from said transaction data transmitting unit includes a compulsory receipt item, notifying said error processing portion of the determination result if the data are determined to be incapable of being received, and receiving the transmitted data if the data are determined to be capable of being received;

a format converter for sequentially converting the data received from said data receiver to be suitable for a predetermined format; and a code conversion processor for code-conversion-processing the converted data to correspond to the account processible transaction form, transaction pattern, transaction terms and standard management information concerned with the transaction form, transaction pattern, transaction terms, and notifying said error processing portion that the data do not agree with the code conversion processing condition if the data do not agree with the code conversion processing condition.

24. The apparatus according to claim 22, wherein said receipt determining processing portion comprises:
- a data receiver for determining whether the data transmitted from said transaction data transmitting unit include a compulsory receipt item, notifying said error processing portion of the determination result if the data are determined to be incapable of being received, and receiving the transmitted data if the data are determined to be capable of being received;
- a format converter for sequentially converting the data received from said data receiver to be suitable for a predetermined format; and
- a code conversion processor for code-conversion-processing the converted data to correspond to the account-processible transaction form, transaction pattern, transaction terms and standard management information concerned with the transaction form, transaction pattern, transaction terms, and notifying said error processing portion that the data do not agree with the code conversion processing condition if the data do not agree with the code conversion processing condition.

25. The apparatus according to claim 21, wherein said data receipt display/input unit of said transaction data receiving unit additionally displays a predetermined input menu screen for inputting further necessary data concerned with the received transaction data,
- wherein said processing unit of said transaction data receiving unit further comprises a received data display processor for commanding said first processing portion to receipt-process the received transaction data if the data are determined to be capable of being received in said receipt determining processing portion, sequentially processing the transaction data receipt-processed by said first processing portion according to the processing conditions of the corresponding items of the transaction form, transaction pattern, transaction terms and standard management information related to the transaction form, transaction pattern and transaction terms, output items to be additionally input if the processed transaction data are suitable to the processing conditions and it is determined that there are items to be further processed, display the processed transaction data on said data receipt display/input unit, and an additional input display processing portion for sequentially displaying items to be additionally input to said data receipt display/input unit so that a predetermined menu screen for additionally inputting the corresponding item of the data deleted by the user's verification for not being the compulsory receipt item, the corresponding item of the data deleted by the user for the reason of being error-processed by said journalizing portion, and items to be additionally input, is suitable to the processing conditions of said first processing portion, and
- wherein said data storage processing portion of said processing unit stores the transaction data comprised of the transaction form, the transaction pattern, the transaction terms and the standard management information concerned with the transaction form, transaction pattern and transaction terms in said transaction data storage portion or said integrated management control database and said integrated accounting database if the transaction data are normally processed by said data receipt display/input unit.

26. The apparatus according to claim 22, wherein said data receipt display/input unit of said transaction data receiving unit additionally displays a predetermined input menu screen for inputting further necessary data concerned with the received transaction data,
- wherein said processing unit of said transaction data receiving unit further comprises a received data display processor for commanding said first processing portion to receipt-process the received transaction data if the data are determined to be capable of being received in said receipt determining processing portion, sequentially processing the transaction data receipt-processed by said first processing portion according to the processing conditions of the corresponding items of the transaction form, transaction pattern, transaction terms and standard management information related to the transaction form, transaction pattern and transaction terms, output items to be additionally input if the processed transaction data are suitable to the processing conditions and it is determined that there are items to be further processed, display the processed transaction data on said data receipt display/input unit, and an additional input display processing portion for sequentially displaying items to be additionally input to said data receipt display/input unit so that a predetermined menu screen for additionally inputting the corresponding item of the data deleted by the user's verification for not being the compulsory receipt item, the corresponding item of the data deleted by the user for the reason of being error-processed by said journalizing portion, and items to be additionally input, is suitable to the processing conditions of said first processing portion, and
- wherein said data storage processing portion of said processing unit stores the transaction data comprised of the transaction form, the transaction pattern, the transaction terms and the standard management information concerned with the transaction form, transaction pattern and transaction terms in said transaction data storage portion or said integrated management control database and said integrated accounting database if the transaction data are normally processed by said data receipt display/input unit.

27. The apparatus according to claim 21, wherein, for the purpose of receiving the transaction data directly from a user, not from said network, said transaction data receiving unit comprises:
- a transaction form display portion for displaying payment and receipt items corresponding to the transaction form on a menu screen of said display/input unit;
- a transaction pattern display portion for displaying purchasing, warehousing, fund expenditure, financial transfer payment items corresponding to transaction patterns on said display/input unit if the payment item is selected from said transaction form display portion as the transaction form, and displaying sales, delivery, fund revenue, financial transfer receipt items corresponding to transaction patterns on said display/input unit if the receipt item is selected by said transaction form display portion as the transaction form;
- a detailed pattern display portion for displaying a predetermined detailed item corresponding to the selected transaction pattern and decided according to accounting principles on said display/input unit, if the transaction pattern is selected by said transaction pattern display portion;
- a first standard management information display portion for displaying at least one or more standard management items corresponding to the detailed item on said display/input unit to then be selected and input, if the detailed item concerned with the transaction pattern is selected by said detailed pattern display portion;

a balancing operation target data determining portion for determining whether transaction the to be balancing-operated is to be balance-deducted, according to the transaction form, transaction pattern, detailed pattern and standard management information, respectively selected and input from said transaction form display portion, transaction pattern display portion, detailed pattern display portion and first standard management information display portion;

a transaction terms display portion for selecting transaction terms corresponding to cash, bank deposits, notes, credit and adjustments and displaying a transaction terms menu screen for inputting the transaction amount corresponding to the selected transaction terms item on said display/input unit if the transaction to be balancing-operated is determined by said balancing operation target determining portion to not be balance-deducted, and if the transaction to be balancing-operated is determined to be balance-deducted, notifying that the target data are to be balancing-operated, reading the balance details of the relevant customer for the corresponding account from said balance-by-account storage portion to then be displayed in said display/input unit, and displaying the transaction terms menu screen on said display/input unit; and a second standard management information display portion for displaying at least one or more standard management items corresponding to the transaction terms if the transaction terms item is selected and input from said transaction terms display portion.

28. The apparatus according to claim 22, wherein, for the purpose of receiving the transaction data directly from a user, not from said network, said transaction data receiving unit comprises:

a transaction form display portion for displaying payment and receipt items corresponding to the transaction form on a menu screen of said display/input unit;

a transaction pattern display portion for displaying purchasing, warehousing, fund expenditure, financial transfer payment items corresponding to transaction patterns on said display/input unit if the payment item is selected from said transaction form display portion as the transaction form, and displaying sales, delivery, fund revenue, financial transfer receipt items corresponding to transaction patterns on said display/input unit if the receipt item is selected by said transaction form display portion as the transaction form;

a detailed pattern display portion for displaying a predetermined detailed item corresponding to the selected transaction pattern and decided according to accounting principles on said display/input unit, if the transaction pattern is selected by said transaction pattern display portion;

a first standard management information display portion for displaying at least one or more standard management items corresponding to the detailed item on said display/input unit to then be selected and input, if the detailed item concerned with the transaction pattern is selected by said detailed pattern display portion;

a balancing operation target data determining portion for determining whether the transaction to be balancing-operated is to be balance-deducted, according to the transaction form, transaction pattern, detailed pattern and standard management information, respectively selected and input from said transaction form display portion, transaction pattern display portion, detailed pattern display portion and first standard management information display portion;

a transaction terms display portion for selecting transaction terms corresponding to cash, bank deposits, notes, credit and adjustments and displaying a transaction terms menu screen for inputting the transaction amount corresponding to the selected transaction terms item on said display/input unit if the transaction to be balancing-operated is determined by said balancing operation target determining portion to not be balance-deducted, and if the transaction to be balancing-operated is determined to be balance-deducted, notifying that the target data are to be balancing-operated, reading the balance details of the relevant customer for the corresponding account from said balance-by-account storage portion to then be displayed in said display/input unit, and displaying the transaction terms menu screen on said display/input unit; and a second standard management information display portion for displaying at least one or more standard management items corresponding to the transaction terms if the transaction terms item is selected and input from said transaction terms display portion.

29. The apparatus according to claim 27, wherein said balancing operation processing portion further comprises:

a balance input controller for reading the balance details of the relevant customer for the account corresponding to the transaction data selected and input from said balance-by-account storage portion by means of said balancing operation processing portion and displaying the read data on said data receipt display/input unit if the transaction data selected and input from said data receipt display/input unit are determined to be balance-deducted by said balancing operation target data determining portion, normally processing the balance details if the input transaction amount is less than or equal to the displayed balance details, and processing the balance details as an error if the input transaction amount is greater than the displayed balance details.

30. The apparatus according to claim 28, wherein said balancing operation processing portion further comprises:

a balance input controller for reading the balance details of the relevant customer for the account corresponding to the transaction data selected and input from said balance-by-account storage portion by means of said balancing operation processing portion and displaying the read data on said data receipt display/input unit if the transaction data selected and input from said data receipt display/input unit are determined to be balance-deducted by said balancing operation target data determining portion, normally processing the balance details if the input transaction amount is less than or equal to the displayed balance details, and processing the balance details as an error if the input transaction amount is greater than the displayed balance details.

31. An accounting processing method using an accounting processing apparatus comprising: one or more transaction data transmitting units for transmitting created transaction data, a transaction data receiving unit having a receipt display/input portion for verifying the transaction data received from said transaction data transmitting unit and displaying balance details for balancing operation processing, a transaction data storage portion for storing the data verified by said data receipt display/input unit, an accounting ledger storage portion for storing accounts information, debit/credit information and predetermined standard management information comprised of at least transaction amount, and a balance-by-account storage portion for storing accounts to be balancing-operated and predetermined standard management information comprised of at least the transaction amount and a data communication network for connecting said transaction data receiving unit with said transaction data transmitting unit, when the transaction data include transaction form information comprised of items representing receipt and payment, transaction pattern information comprised of items representing purchase and sales and having at least merchandise, transaction terms information comprised of at least cash, and predetermined standard management information comprised of predetermined management items for detailed control, corresponding to the transaction form, transaction pattern and transaction terms, and corresponding to a predetermined data format, said method comprising the steps of:

- transmitting the transaction data to said transaction data receiving unit through said network;
- determining whether the data transmitted from the transaction data transmitting unit through said network are capable of being received, and determining whether the data are converted into an interpretable and processible code if the data are capable of being received;
- receipt-processing the received transaction data if the data are determined to be capable of being received in said receipt determining step, and sequentially processing the receipt-processed data according to the processing conditions of the corresponding items of the transaction form, transaction pattern, transaction terms and standard management information concerned with the transaction form, transaction pattern, and transaction terms;
- determining whether the processed transaction data are to be balancing-operated, and displaying normally processed transaction data on said receipt display/input portion if the transaction data are determined to be balance-deducted to then be normally processed;
- deleting the received transaction data if the data are determined to be incapable of being received or being receipt-processed;
- storing the transaction data including the transaction form, transaction pattern, transaction terms and standard management information concerned with the transaction form, transaction pattern, and transaction terms, in the transaction data storage portion if the transaction data are normally processed in said receipt display/input portion;
- classifying the transaction by generating account information corresponding to the transaction form, transaction pattern, transaction terms and standard management information concerned with the transaction form, transaction pattern and transaction terms, and debit/credit position information, and temporarily storing the generated account information, debit/credit position information and predetermined management information having at least the transaction amount;
- classifying the temporarily stored accounts information, debit/credit position information and predetermined standard management information having at least the transaction amount into a debit side and a credit side, summing the same, normally processing if the sum of the debit/credit side transaction amount agrees with balancing principles, displaying journalizing result on said receipt display/input portion, and storing the same in said accounting ledger storage portion;
- displaying an error message on said receipt display/input portion if the sum of the debit/credit side transaction amount does not agree with balancing principles, determining whether the transaction data, are to be balancing-operated among the normally processed transaction data, and temporarily storing account information, debit/credit position information and predetermined standard management information having the transaction amount;
- searching balance details of the relevant customer for the accounts corresponding to the transaction data from said balance-by-account storage portion if the transaction data are determined to be balance-deducted, comparing the balance details with the data to be balance-deducted, error-processing and displaying if the transaction amount of the transaction data to be balance-deducted is greater than that of the searched balance details, normally processing if the transaction amount of the to-be-balance-deducted transaction data is less than or equal to that of the searched balance details, classifying the transaction data into data to be balance-summed and data to be balance-deducted;
- searching the balance details of the relevant customer for the corresponding account from said balance-by-account storage portion if the transaction is classified into data to be balance-summed in said classifying step, adding the transaction data to be balance-summed to the balance details, deducting the transaction data to be balance-deducted from the balance details if the data are classified into data to be balance-deducted, and storing the result in said balance-by account storage portion; and
- reading the data stored in said accounting ledger storage portion and the balance-by-account storage portion by the user's request, outputting the read data according to a predetermined format to said output unit, and displaying the same on said data receipt display/input unit.

32. The method according to claim 31, wherein, when the transaction data for management control are standardized, formulated and compounded into a predetermined data format to be commonly used throughout all departments of an enterprise for business activities, and the transaction data include transaction form information comprised of items representing receipt and payment, transaction pattern information comprised of items representing purchase and sales, transaction terms information comprised of predetermined transactions terms having at least cash, and standard management information comprised of predetermined management items for detailed management, corresponding to the transaction form, transaction pattern and transaction terms, and corresponds to a predetermined data format, and that the transaction data storage portion of said data storage unit comprises an integrated management control database for storing the transaction data displayed on said data receipt display/input unit by said received data display processing portion and normally processed, and having databases by management control departments divided according to predetermined management control items, and an integrated accounting database for storing data necessary for an accounting process for financial control, among the data stored in said integrated management control database, said step of storing the transaction data in said transaction data storage portion comprises the substeps of:

- classifying the transaction data to be stored in the databases for the respective departments of said integrated management control database for integrated control of the transaction data if the management control data are normally processed, and storing the classified data for the respective departments in the corresponding databases; and selectively extracting the transaction data to be account-processed for financial control from the databases for the respective departments of said integrated management control database and storing the same in said integrated accounting database, and the data are read from said integrated accounting database.

33. The method according to claim 31, further comprising the steps of:

performing sequential processing steps, determining whether there are items suitable to the processing conditions and to be further processed other than compulsory receipt items, and displaying a menu screen for the items to be additionally input on said data receipt display/input unit if there are items to be further processed or deleted by the user after being processed as an error in said journalizing step; and storing the data for the items to be additionally input through said data receipt display/input unit on said data storage unit.

34. The method according to claim 32, further comprising the steps of:

displaying the performing of sequential processing steps, determining whether there are items suitable to the processing conditions and to be further processed other than compulsory receipt items, displaying a menu screen for the items to be additionally input on said data receipt display/input unit if there are items to be further processed or deleted by the user after being error processed in said journalizing step; and storing the data for the items to be additionally input through a data receipt display/input unit on said integrated management control database and said integrated accounting database.

35. The method according to claim 31, further comprising the steps of:

displaying a data input screen on said data receipt display/input unit, for the purpose of receiving the transaction data directly from a user, not from said network; and storing the transaction data in said transaction data storage portion if the displayed transaction data are input through said data receipt display/input unit.

36. The method according to claim 32, further comprising the steps of:

displaying a data input screen on said data receipt display/input unit, for the purpose of receiving the transaction data directly from a user, not from said network; and storing the transaction data in said integrated management control database if said dismayed transaction data are input through said data receipt display/input unit.

37. The method according to claim 35, wherein said data input screen displaying step comprises the steps of:

displaying payment and receipt items corresponding to a transaction form on the screen or said data receipt display/input unit;

displaying purchasing, warehousing, fund expenditure, financial transfer payment items corresponding to transaction patterns on the screen of said data receipt display/input unit if the payment item is selected in the transaction form displaying step as the transaction form, and displaying sales, delivery, fund revenue, financial transfer receipt items corresponding to transaction patterns on the screen of said data receipt display/input unit if the receipt item is selected in said transaction form displaying step as the transaction form;

displaying a predetermined detailed item corresponding to the selected transaction pattern and decided according to accounting principles on the screen of said data receipt display/input unit, if the transaction pattern is selected in said transaction pattern displaying step;

displaying at least one or more standard management items corresponding to the detailed item on the screen of said data receipt display/input unit to then be selected and input, if the detailed item concerned with the transaction pattern is selected in said detailed pattern displaying step;

determining whether the transaction to be balancing-operated is to be balance-deducted, according to the transaction form, transaction pattern, detailed pattern and standard management information, respectively selected and input in said transaction form displaying step and detailed pattern displaying step;

selecting transaction terms including cash, bank deposit, note, credit and adjustment items and displaying a transaction terms menu screen for inputting the transaction amount corresponding to the selected transaction terms item on the screen of said data receipt display/input unit if the transaction to be balancing-operated is determined in said transaction determining step to not be balance-deducted, and if the transaction to be balancing-operated is determined to be balance-deducted, notifying that the target data are to be balancing-operated, reading the balance details of the relevant customer for the corresponding account from said balance-by-account storage portion to then be displayed on said data receipt display/input unit, and displaying the transaction terms menu screen on said data receipt display/input unit; and displaying standard management information including bank codes for bank deposit item and including customers, management periods and bank codes for credit and note items if the bank deposit, credit and note items are selected and input in said transaction terms displaying step as the transaction terms.

38. The method according to claim 36, wherein said data input screen displaying step comprises the step of:

displaying payment and receipt items corresponding to a transaction form on the screen of said data receipt display/input unit;

displaying purchasing, warehousing, fund expenditure, financial transfer payment items corresponding to transaction patterns on the screen of said data receipt display/input unit if the payment item is selected in the transaction form displaying step as the transaction form, and displaying sales, delivery, fund revenue, financial transfer receipt items corresponding to transaction patterns on the screen of said data receipt display/input unit if the receipt item is selected in said transaction form displaying step as the transaction form;

displaying a predetermined detailed item corresponding to the selected transaction pattern and decided according to accounting principles on the screen of said data receipt display/input unit, if the transaction pattern is selected in said transaction pattern displaying step;

displaying at least one or more standard management items corresponding to the detailed item on the screen or said data receipt display/input unit to then be selected and input, if the detailed item concerned with the transaction pattern is selected in said detailed pattern displaying step;

determining whether the transaction to be balancing-operated is to be balance-deducted, according to the transaction form, transaction pattern, detailed pattern and standard management information, respectively selected and input in said transaction form displaying step and detailed pattern displaying step;

selecting transaction terms including cash, bank deposit, note, credit and adjustment items and displaying a transaction terms menu screen for inputting the transaction amount corresponding to the selected transaction terms item on the screen of said data receipt display/input unit it the transaction is determined in said transaction to be balancing-operated determining step to not be balance-deducted, and if the transaction to be balancing-operated are determined to be balance-deducted, notifying that the target data is to be balancing-operated, reading the balance details of the relevant customer for the corresponding account from said balance-by-account storage portion to then be displayed on said data receipt display/input unit, and displaying the transaction terms menu screen on said data receipt display/input unit; and displaying standard management information including Hank codes for bank deposit item and including customers, management periods and bank codes For credit and note items of the bank deposit, credit and note items are selected and input in said transaction terms displaying step as the transaction terms.

* * * * *